(12) United States Patent
Sugai et al.

(10) Patent No.: US 6,871,530 B2
(45) Date of Patent: Mar. 29, 2005

(54) PHYSICAL QUANTITY ESTIMATING APPARATUS AND TIRE STATE DETERMINING APPARATUS, AND ESTIMATING METHOD OF SAME AND DETERMINATION METHOD OF SAME

(75) Inventors: Masaru Sugai, Aichi-gun (JP); Katsuhiro Asano, Toyoake (JP); Takaji Umeno, Nisshin (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/410,166

(22) Filed: Apr. 10, 2003

(65) Prior Publication Data

US 2003/0192375 A1 Oct. 16, 2003

(30) Foreign Application Priority Data

Apr. 11, 2002 (JP) ....................................... 2002-109818

(51) Int. Cl.$^7$ .............................................. G01M 17/02
(52) U.S. Cl. ........................................... 73/146; 701/80
(58) Field of Search ........................... 73/146; 303/150; 701/80, 71

(56) References Cited

U.S. PATENT DOCUMENTS 5,588,721 A * 12/1996 Asano et al. ............... 303/163
5,771,480 A   6/1998 Yanase
6,640,623 B2 * 11/2003 Ono et al. .................... 73/146

FOREIGN PATENT DOCUMENTS

| EP | 0 783 983 A1 | 7/1997 |
| JP | A 9-188114 | 7/1997 |

OTHER PUBLICATIONS

Y. Nakao et al., "Estimation of Friction Levels Between Tire and Road," Society of Automotive Engineers, Inc., 2002, pp. 1–5.

* cited by examiner

Primary Examiner—Edward Lefkowitz
Assistant Examiner—Andre Allen
(74) Attorney, Agent, or Firm—Oliff & Berridge, PLC

(57) ABSTRACT

A physical quantity estimating apparatus and method that detects an acceleration and deceleration rate of a vehicle body and a rotational velocity of a wheel, estimates at least one of a tire radius of each wheel, a road surface $\mu$ gradient, and a spring constant of a combination spring which combines spring elements, with a distribution ratio of braking force and driving force to a front and rear wheel and a distribution ratio of a load on each wheel that is corrected according to the detected acceleration and deceleration rate, as known values, based on a wheel speed difference of any two wheels, during acceleration and deceleration of a vehicle, of an ideal vehicle model that takes into consideration a tire torsional spring element and a suspension longitudinal spring element and estimates a tire type based on the estimated road surface $\mu$ gradient and spring constant.

38 Claims, 10 Drawing Sheets

VEHICLE-WHEEL MODEL

VEHICLE-WHEEL MODEL

PARAMETER ESTIMATION RESULTS
(SUMMER TIRES ON ALL FOUR WHEELS,
AVERAGE VEHICLE SPEED 50 [km/h])

PARAMETER ESTIMATION RESULTS (SUMMER TIRES ON FRONT WHEELS, STUDLESS TIRES ON REAR WHEELS, AVERAGE VEHICLE SPEED 50 [km/h])

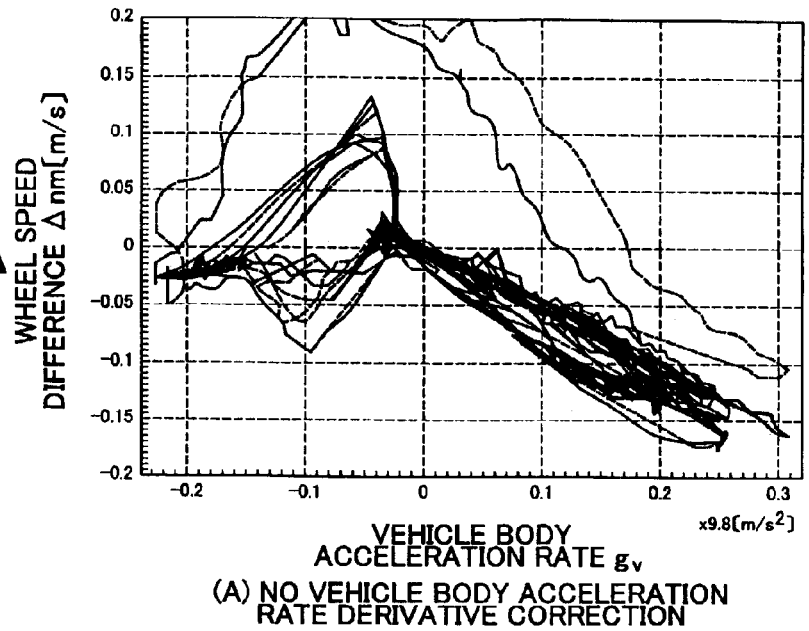
F I G. 5A
(A) NO VEHICLE BODY ACCELERATION RATE DERIVATIVE CORRECTION
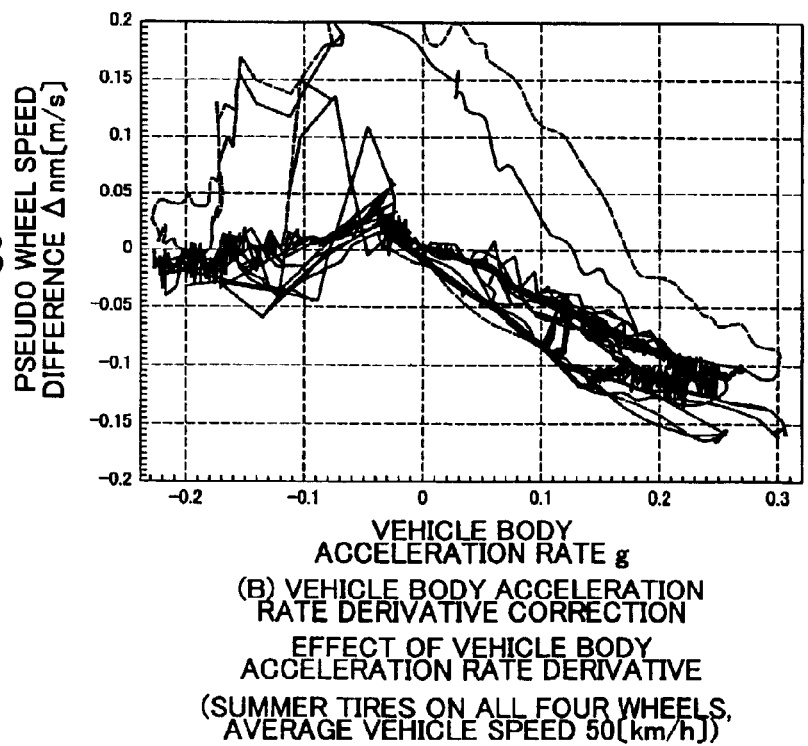
F I G. 5B
(B) VEHICLE BODY ACCELERATION RATE DERIVATIVE CORRECTION
EFFECT OF VEHICLE BODY ACCELERATION RATE DERIVATIVE
(SUMMER TIRES ON ALL FOUR WHEELS, AVERAGE VEHICLE SPEED 50[km/h])

RELATIONSHIP BETWEEN IDEAL VEHICLE BODY ACCELERATION RATE AND FRONT AND REAR WHEEL SPEED DIFFERENCE

RELATIONSHIP BETWEEN ACTUAL VEHICLE BODY ACCELERATION RATE AND FRONT AND REAR WHEEL SPEED DIFFERENCE

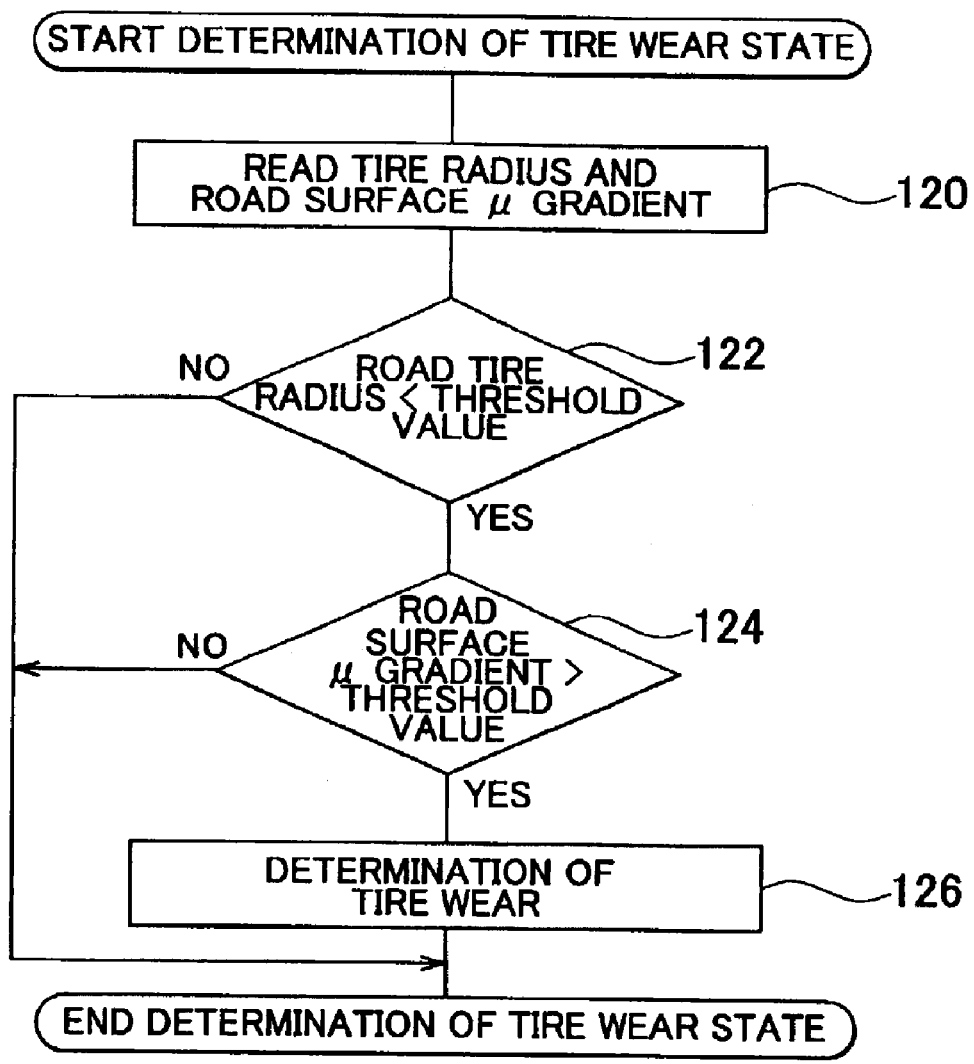

ID STATES PATENT

PHYSICAL QUANTITY ESTIMATING APPARATUS AND TIRE STATE DETERMINING APPARATUS, AND ESTIMATING METHOD OF SAME AND DETERMINATION METHOD OF SAME

INCORPORATION BY REFERENCE

The disclosure of Japanese Patent Application No. 2002-109818 filed on Apr. 11, 2002, including the specification, drawings and abstract are incorporated herein by reference in its entirety.

BACKGROUND OF THE INVENTION

1. Field of Invention

The invention relates to a physical quantity estimating apparatus and a tire state determining apparatus. More particularly, the invention relates to a physical quantity estimating apparatus capable of estimating a physical quantity relating to a tire radius, taking into consideration a tire torsional spring and a suspension longitudinal spring of an estimated ideal vehicle model, using a method for estimating a road surface friction coefficient ($\mu$) gradient based on a wheel speed difference between any two wheels, e.g., a rear wheel and a front wheel, and an acceleration and deceleration rate of a vehicle during acceleration and deceleration of the vehicle, and a tire state determining apparatus that determines a tire state such as a tire type using the physical quantity estimated by the physical quantity estimating apparatus, and a determination method of that tire state determining apparatus.

2. Description of Related Art

As related art, a tire identification method for determining the type of tire on a vehicle is known (Japanese Patent Laid-Open Publication No. 9-188114). According to this method, the rotational speeds of four tires fitted on a vehicle are measured, and a ratio (front to rear wheel ratio) of the rotational speed of the front wheels to the rotational speed of the rear wheels is calculated from the measured rotational speeds. The type of tire is then identified by comparing a speed, a front to rear wheel ratio function, which was created based on data from a tire of a known type, to a value of the calculated front to rear wheel ratio.

The tire identification method of the foregoing related art, however, does not take into consideration the difference in the tire radius, and is therefore unable to determine the tire type with high accuracy.

SUMMARY OF THE INVENTION

In view of the foregoing problem, the invention thus provides a physical quantity estimating apparatus for estimating a physical quantity that can determine, with high accuracy, a tire type or the like, a tire state determining apparatus able to determine a tire state, such as the tire type, using the physical quantity estimated by the physical quantity estimating apparatus, and a determination method of this tire state determining apparatus.

First, the principle of this invention will be described. FIG. 6 is a graph that shows the ideal characteristics of a front and rear wheel speed difference with respect to a longitudinal acceleration rate of a vehicle body in a rear wheel drive vehicle. This figure shows an ideal state, in which tire radius information is known, there is no offset of the acceleration sensor, and the spring elements of the tire and suspension are disregarded. A road surface friction coefficient gradient (i.e., hereinafter referred to as "road surface $\mu$ gradient") can be obtained for each of the front and rear wheels based on the slope of the straight line.

In an actual vehicle, however, various errors make the characteristic shift or change from the ideal characteristic, shown in FIG. 6, to a characteristic such as that shown in FIG. 7. This characteristic appears as a combined line, in which a curved line portion appearing in one part as an excessive loop characteristic and a straight line portion continuing on from that curved line portion (i.e., corresponding to the broken line in quadrant 4 in FIG. 6) are combined. The characteristic appears at this combined line because of an effect from a spring constant mainly thought to be related to the front wheels.

Also, a minute difference in the tire radius of the front and rear wheels, i.e., a change in the difference between the front and rear wheel speed, cause this combined line to make a parallel shift in the direction along the vertical axis. Also, an offset of the acceleration rate sensor, i.e., a change in the vehicle body acceleration, causes the combined line to make a parallel shift in the direction along the horizontal axis. In this characteristic as well, it is possible to obtain the road surface $\mu$ gradient for each of the front and rear wheels based on the slope of the straight line portion.

This invention uses the shift or change in this characteristic from the ideal state in estimating the parameters. For example, it is possible to estimate a minute difference in the tire radius based on the amount of shift of the junction portion of the curved line portion and the straight line portion in the direction along the vertical axis. Further, it is possible to estimate the offset of the acceleration rate sensor based on the amount of shift in the direction along the horizontal axis, i.e., based on the vehicle body acceleration rate. Moreover, it is possible to estimate the spring constant of the spring elements that appear equivalent, using an ideal model that takes into consideration the springs together with the excessive loop characteristic.

These parameters that should be estimated can also be obtained in a batch, or over a series of calculations, based on a mathematical model. It is also possible to solve them in a batch using the least-squares method or the like. It is possible to appropriately estimate the parameters in certain parts by selecting an appropriate estimating method, for example, by appropriately adjusting the forgetting coefficient, from a condition of the property of each parameter, e.g., with the tire radius, and the inability of the tire radius to change at relatively high speeds. Further, it is also possible to calculate the parameters individually by directly obtaining the amount of shift or the like, based on a schematic method.

In the above description, a case in which a rear wheel drive vehicle is used was given, but the invention may also be applied to a front wheel drive vehicle or a four wheel drive vehicle in the same way.

A physical quantity estimating apparatus, which is one aspect of the invention, is based on the foregoing principle and includes an estimating portion that estimates at least one of a physical quantity relating to a tire radius of each wheel, a physical quantity relating to a road surface friction coefficient, and a physical quantity relating to a spring constant of a combination spring which combines spring elements, with a distribution ratio of a braking force and a driving force to each wheel and a distribution ratio of a load on each wheel that has been corrected according to a detected acceleration and deceleration rate, as known values, based on a wheel speed difference between any two wheels and the acceleration and deceleration rate of a vehicle during acceleration and deceleration of the vehicle.

Also, a physical quantity estimating method, which is another aspect of the invention, estimates at least one of a physical quantity relating to a tire radius of each wheel, a physical quantity relating to a road surface friction coefficient, and a physical quantity relating to a spring constant of a combination spring which combines spring elements, with a distribution ratio of a load on each wheel that has been corrected according to a distribution ratio of a braking force and a driving force to each wheel, as known values, based on a wheel speed difference between any two wheels and an acceleration and deceleration rate of a vehicle during acceleration and deceleration of the vehicle.

Also, a tire state determining apparatus, which is another aspect of the invention, includes: an estimating portion that estimates at least one of a physical quantity relating to a tire radius of each wheel, a physical quantity relating to a road surface friction coefficient, and a physical quantity relating to a spring constant of a combination spring which combines spring elements, with a distribution ratio of a braking force and a driving force to each wheel and a distribution ratio of a load on each wheel, as known values, based on a wheel speed difference between any two wheels and an acceleration and deceleration rate of a vehicle during acceleration and deceleration of the vehicle; and a determining portion that determines at least one of a tire type, a tire air pressure, and a tire wear state, based on at least one of the physical quantities estimated by the estimating portion.

Also, a tire state determination method, which is another aspect of the invention, estimates at least one of a physical quantity relating to a tire radius of each wheel, a physical quantity relating to a road surface friction coefficient, and a physical quantity relating to a spring constant of a combination spring which combines spring elements, with a distribution ratio of a load on each wheel that has been corrected according to a distribution ratio of a braking force and a driving force to each wheel, as known values, based on a wheel speed difference between any two wheels and an acceleration and deceleration rate of the vehicle during acceleration and deceleration of the vehicle, and determines at least one of a tire type, a tire air pressure, and a tire wear state, based on at least one of the estimated physical quantities.

The physical quantity relating to the tire radius may be a radius ratio of a tire other than a reference tire to the reference tire, or a tire radius obtained from the radius ratio. Further, the physical quantity relating to the road surface friction coefficient may be a reciprocal of a road surface friction coefficient gradient ($\mu$ gradient) with respect to a slip rate, or a road surface $\mu$ gradient obtained from the reciprocal. Moreover, the physical quantity relating to the spring constant may be a reciprocal of a spring constant of a combination spring standardized by dividing the spring constant of the combination spring by a vehicle body weight, or a spring constant of the combination spring obtained from the reciprocal of the spring constant.

The estimating portion may estimate two physical quantities from among the tire radius, the road surface friction coefficient, and the spring constant of the combination spring which combines spring elements.

The determining portion may determine the tire type based on the estimated road surface friction coefficient gradient and the spring constant of the combination spring. Also, the determining portion may determine the tire air pressure based on the estimated tire radius and spring constant of the combination spring. Further, the determining portion may also determine the tire wear state based on the estimated tire radius and road surface friction coefficient gradient.

In this invention, the tire type may be determined based on the road surface friction coefficient gradient when the slip rate is near zero.

Further, according to the invention, the estimating portion may calculate radius ratios $k_{rn}$ and $k_{rm}$ of a plurality of tires other than the reference tire, to a radius $R_0$ of the reference tire, or the tire radii; reciprocals $1/\beta_n$ and $1/\beta_m$ of the road surface friction coefficient gradients with respect to slip rates of the plurality of tires, or the road surface friction coefficient gradients; and reciprocals $1/k_{stn}$ and $1/k_{stm}$ of the spring constants of the combination springs standardized by dividing the spring constants of the combination springs of the plurality of tires by a vehicle body weight, or the spring constants of the combination springs.

$$R_0(k_{rn}\omega_n - k_{rm}\omega_m) = \left(\frac{k_{fn}v_a}{k_{\omega n}\beta_n} - \frac{k_{fm}v_a}{k_{\omega m}\beta_m}\right)g_v + \left(\frac{k_{fn}}{k_{stn}} - \frac{k_{fm}}{k_{stm}}\right)d_v$$

where $\omega_n$ and $\omega_m$ represent angular velocities of the plurality of wheels; $v_a$ represents an average wheel speed of the four wheels; $g_v$ represents a ratio of the vehicle body acceleration rate to a gravitational force acceleration rate; and $d_v$ represents a derivative of the vehicle body acceleration rate that has been standardized by the gravitational acceleration rate.

This invention estimates at least one of the physical quantity relating to the tire radius of each wheel, the physical quantity relating to the road surface friction coefficient, and the physical quantity relating to the spring constant of the combination spring which combines the spring elements. Therefore, it is possible to estimate the physical quantity that enables the tire type or the like to be determined with high accuracy. The distribution ratio of the braking force and driving force to each wheel and the distribution ratio of the load on each wheel that has been corrected according to the detected acceleration and deceleration rate are known values, based on the wheel speed difference between any two wheels during acceleration and deceleration of the vehicle, of this ideal vehicle model.

Also, because the physical quantity can be estimated as described above, it is possible to make at least one of a tire type determination based on the estimated road surface $\mu$ gradient and spring constant of the combination spring, the tire air pressure determination based on the estimated tire radius and spring constant of the combination spring, and the tire wear state determination based on the estimated tire radius and road surface $\mu$ gradient, and determine with high accuracy the tire type, tire air pressure, and tire wear.

BRIEF DESCRIPTION OF THE DRAWINGS

The above-mentioned exemplary embodiment and other exemplary embodiments, objects, features, advantages, technical and industrial significance of this invention will be better understood by reading the following detailed description of the exemplary embodiments of the invention, when considered in connection with the accompanying drawings, in which:

FIG. 5A is a line graph plotting a characteristic of a vehicle body acceleration rate $g_v$ and a wheel speed difference $\Delta_{nm}$;

FIG. 5B is a line graph plotting a characteristic of a pseudo wheel acceleration rate $\Delta'_{nm}$ with respect to the vehicle body acceleration rate $g_v$;

FIG. 11 is a flowchart showing a tire wear state determining routine.

DETAILED DESCRIPTION OF PREFERRED EMBODIMENTS

Hereinafter, an exemplary embodiment of the invention will be described with reference to the appended drawings. In this exemplary embodiment, a physical quantity estimating apparatus according to the invention has been applied to a tire state determining apparatus such as an apparatus that determines a tire type.

Figure 1:
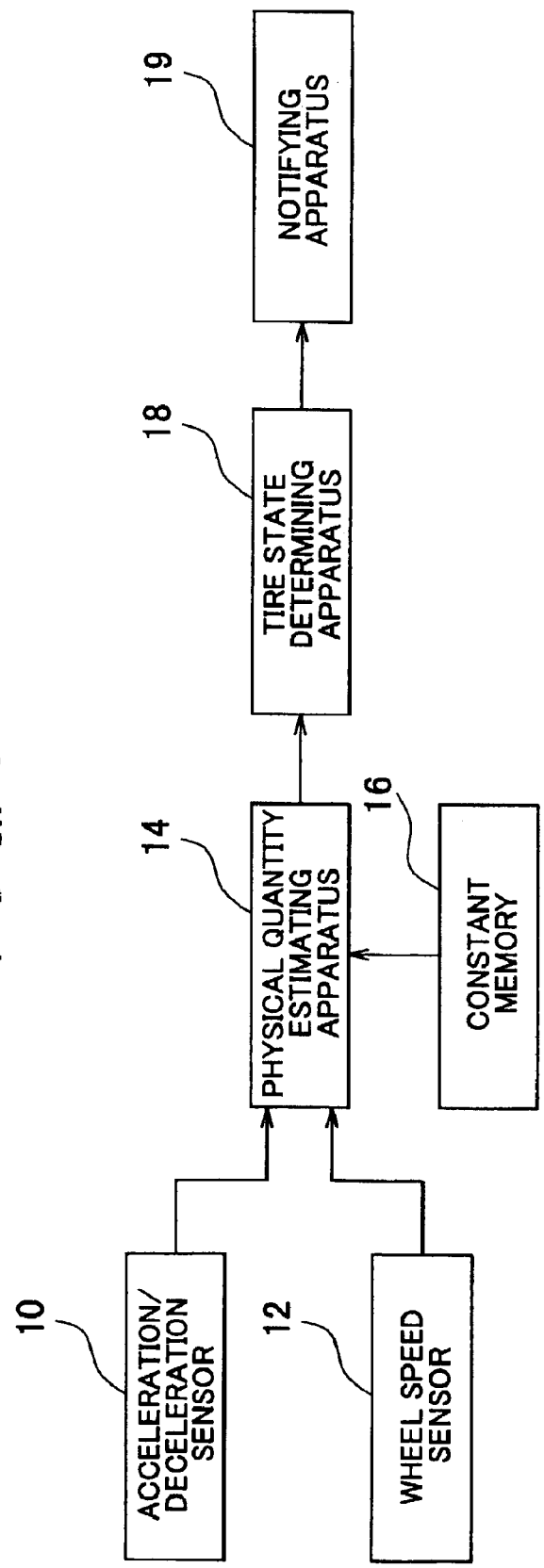
FIG. 1 is a block diagram showing one exemplary embodiment of the invention.

As shown in FIG. 1, this exemplary embodiment is configured with an acceleration/deceleration sensor 10 that detects an acceleration and deceleration rate of a vehicle body, a wheel speed sensor 12 provided on each of the four wheels, which detects a rotation speed (i.e., wheel speed) of the wheel on which it is provided (only one wheel speed sensor is shown in the figure), a physical quantity estimating apparatus 14 (i.e., an estimating portion) as an estimating means, and a constant memory 16. The constant memory 16 stores known values and the like indicative of a distribution ratio of braking force and driving force to each wheel and a distribution ratio of a load on each wheel when the vehicle is stopped.

Further, the physical quantity estimating apparatus 14 estimates the physical quantity according to a method described later, using the value of the distribution ratio of braking force and driving force to each wheel and the distribution ratio of the load on each wheel that has been corrected according to the detected acceleration and deceleration rate, based on the wheel speed difference between any two wheels during deceleration and acceleration of the vehicle, using a vehicle-wheel model.

This vehicle-wheel model takes into consideration the tire torsional spring element and the suspension longitudinal spring element, which will be described later. Also, the wheel speed difference is detected by the wheel speed sensor 12, as will be described later. In addition, the distribution ratio of the braking force and the driving force to each wheel and the distribution ratio of the load on each wheel are stored in the constant memory 16.

The physical quantity estimating apparatus 14 estimates a radius ratio of a tire other than a reference tire to the radius of the reference tire, or estimates the tire radius obtained from the radius ratio, as a physical quantity relating to tire radius, as will be described later. Then, the physical quantity estimating apparatus 14 estimates the reciprocal of a road surface friction coefficient gradient ($\mu$ gradient) with respect to the slip rate, or the road surface $\mu$ gradient obtained from that reciprocal, as a physical quantity relating to the road surface friction coefficient. The physical quantity estimating apparatus 14 is then able to estimate the reciprocal of a spring constant of a combination spring that has been standardized by dividing the spring constant of the combination spring that combines a tire torsional spring element and a suspension longitudinal spring element by the vehicle body weight, or estimate the spring constant of the combination spring obtained from the reciprocal of the spring constant, as the physical quantity relating to the spring constant.

Also, to the physical quantity estimating apparatus 14 is connected a tire state determining apparatus 18 (i.e., a determining portion) as a determining means for making at least one of a tire type determination, a tire air pressure determination, and a tire wear state determination.

The tire state determining apparatus 18 determines at least one of the tire type, tire air pressure, and tire wear state based on at least one physical quantity such as the road surface $\mu$ gradient, the tire radius ratio, or the spring constant of the combination spring estimated by the physical quantity estimating apparatus 14, as will be described later. In order for the tire state determining apparatus 18 to make highly accurate determinations, the tire type determination need only be made based on the two physical quantities of the estimated road surface $\mu$ gradient and the spring constant of the combination spring also. The tire air pressure determination need only be made based on the two physical quantities of the estimated tire radius and the spring constant of the combination spring. Furthermore, the tire wear state determination need only be made based on the two physical quantities of the estimated tire radius and the estimated road surface $\mu$ gradient. The tire state determining apparatus 18 is also connected to a notifying apparatus 19 that notifies an occupant of the results of the determinations by the tire state determining apparatus 18.

Hereinafter, the physical quantity estimation performed by the physical quantity estimating apparatus will be described, after which the determination of tire type and the like by the tire state determining apparatus will be described.

Figure 2A:
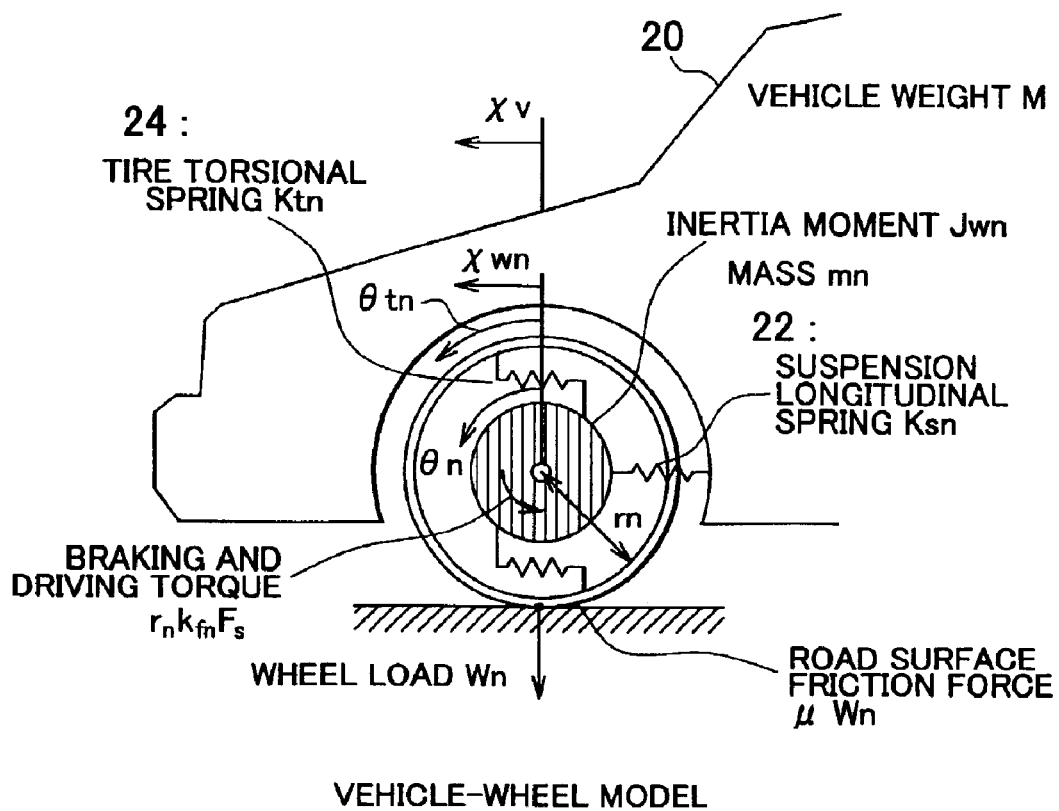
FIG. 2A is a schematic diagram showing an ideal vehicle model that takes into consideration a tire torsional spring element and a suspension longitudinal spring element according to an exemplary embodiment of the invention.

First, the vehicle-wheel model during acceleration and deceleration of the vehicle will be described. As shown in FIG. 2A, this vehicle-wheel model is configured with four wheels being mounted on a vehicle body 20 via a suspension longitudinal spring element 22. Each of the wheels has a mass in and is provided with a tire torsional spring element 24. The mass of the vehicle is M. The model in FIG. 2A shows only one wheel. However, because the total force from all of the wheels acts on the vehicle body, the equation for motion is expressed by four expressions shown below in expression (1).

$$s^2 J_{\omega n}\theta_n = r_n k_{fn} F_s - K_{tn}(\theta_n - \theta_{tn})$$

$$0 = \frac{K_{tn}}{r_n}(\theta_n - \theta_{tn}) - sW_n\alpha_n(r_n\theta_{tn} - x_{Wn}) \quad (1)$$

$$s^2 m_n x_{Wn} = sW_n\alpha_n(r_n\theta_n - x_{Wn}) - K_{sn}(xW_n - x_v)$$

$$s^2 M x_v = \Sigma K_{sn}(x_{Wn} - x_v) \quad (1)$$

Figure 2B:
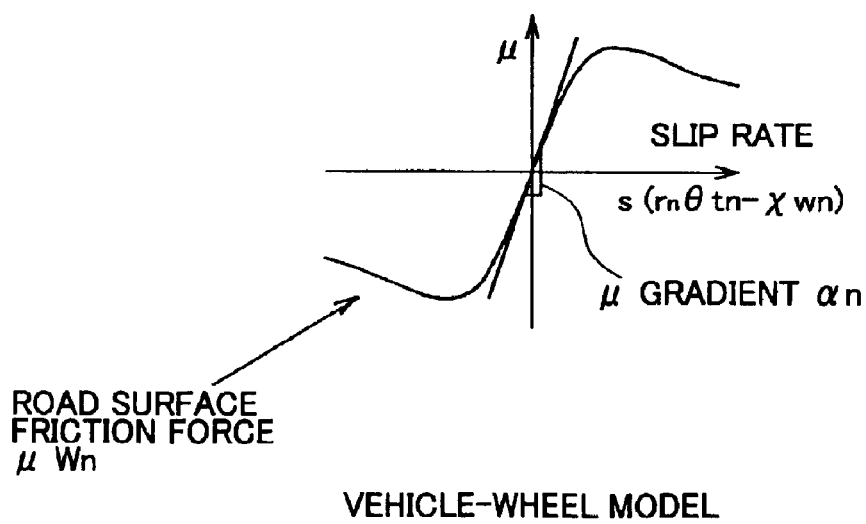
FIG. 2B is a line graph showing the relationship between a road surface friction coefficient $\mu$ and a slip speed.

The variables shown in expression (1) and FIG. 2A indicate the following physical quantities:

$\alpha_n$: gradient of the road surface friction coefficient $\mu$ with respect to the slip speed (The slope of the tangent line at the point of origin of the curve showing the relationship between the road surface friction coefficient $\mu$ and the slip speed shown in FIG. 2B, i.e., the road surface $\mu$ gradient)

$K_{tn}$: spring constant of tire torsional spring element $\Theta_n$: rotation angle of wheel axle (rotation angle of the axle used in the detection of the wheel speed)

$K_{sn}$: spring constant of suspension longitudinal spring element $\Theta_{tn}$: rotation angle of wheel surface M: vehicle mass $x_{wn}$: longitudinal position of wheel $J_{wn}$: rotational inertia moment of wheel $x_v$: longitudinal position of vehicle $W_n$: wheel load $k_{fn}$: distribution ratio of braking force and driving force to front and rear wheels $m_n$: wheel mass $F_s$: sum of the force acting on all axles of the four wheels $r_n$: wheel radius n: numbers 1 through 4 indicating wheels In expression (1) above, the first expression indicates the rotational movement of the tire, the second expression indicates the balance of the force with the tire surface in contact with the road surface, the third expression indicates the suspension longitudinal movement, and the fourth expression indicates the action of the force from each wheel acting on the vehicle.

Next, when the slip speed Δn (wheel speed $v_n$–vehicle body speed $v_v$) of each wheel is obtained from expression (1), it can be expressed by expression (2) below.

$$\Delta n = vn - vn = s(r_n\theta n - xv) \quad (2)$$

$$= \left(\frac{1}{W_n\alpha_n} + \frac{r_n^2}{K_{tn}}s\right)\left(1 + \frac{s^2 m_n}{K_{sn}}\right)\left(k_{fn}F_s - \frac{s^2 J_{\omega n}}{r_n}\theta_n\right) +$$

-continued $$\frac{s}{K_{sn}}\left\{k_{fn}F_s - \left(\frac{J_{\omega n}}{r_n^2} + m_n\right)s^2 r_n \theta_n\right\}$$

In expression (2), the sum Fs of the force acting on the four wheels balances with the sum of the force acting on the vehicle body, the force acting on the wheels in the longitudinal direction, and the force acting on the wheels in the direction of rotation. As a result, expression (3) below is obtained. In expression (3), the first term on the right is indicative of the force acting on the vehicle body, the second term is indicative of the force acting on the wheels in the longitudinal direction, and the third term is indicative of the force acting on the wheels in the direction of rotation.

$$F_s = s^2 M x_v + \sum s^2 m_n x_{Wn} + \sum \frac{s^2 J_{wn}}{r_n}\theta_n \quad (3)$$

Here, for the sake of simplifying expression (2), because $J_{wn}/r^2_n$, $m_n \ll M$, the rotation of the wheels and the longitudinal inertia of the wheels are disregarded. Furthermore, because $m_n/K_{sn} \ll 1$, expression (2) can be expressed by expression (4) below.

$$\Delta_n = \frac{k_{fn}}{W_n\alpha_n}s^2 M x_v + \left(\frac{r_n^2}{K_{tn}} + \frac{1}{K_{sn}}\right)k_{fn}s^3 M x_v \quad (4)$$

$$= \frac{k_{fn}}{k_{wn}\alpha_n}g_v + \frac{k_{fn}}{k_{stn}}d_v$$

where the distribution ratio $k_{wn}$ of the load on each wheel; the value $k_{stn}$, in which the spring constant of the combination spring that combines the tire torsional spring element and the suspension longitudinal spring element is standardized by the vehicle weight MG (G being gravitational acceleration rate); the ratio $g_v$ of the vehicle body acceleration rate to the gravitational acceleration rate G; and the value $d_v$, in which the rate of change in the vehicle body acceleration rate (i.e., the derivative of the acceleration rate) is standardized by the gravitational acceleration rate G, are each expressed as follows.

$$k_{wn} = \frac{W_n}{MG} \quad k_{stn} = \frac{K_{sn}K_{tn}/r_n^2}{(K_{sn} + K_{tn}/r_n^2)MG} \quad g_v = \frac{s^2 x_v}{G} \quad d_v = \frac{s^3 x_v}{G} \quad (5)$$

The tire torsional spring element and the suspension longitudinal spring element are both taken into account in this exemplary embodiment.

Generally, the slip rates $S_n$ during braking and during driving are given in expression (6) below.

$$S_n = \begin{cases} \frac{\Delta_n}{v_v} = \frac{v_n - v_v}{v_v} & \cdots \text{Braking force} \\ \frac{\Delta_n}{v_n} = \frac{v_n - v_v}{v_n} & \cdots \text{Driving force} \end{cases} \quad (6)$$

However, because $v_v$ nearly equals $v_n$ in the region where the slip rate is relatively small, the slip rate $S_n$ is defined by expression (7) below using an average wheel speed $v_a$ of the four wheels.

$$S_n = \frac{\Delta_n}{v_a} = \frac{v_n - v_v}{v_a}, \quad v_a = \frac{\sum v_n}{4} \qquad (7)$$

At this time, when the gradient (road surface $\mu$ gradient) $\beta_n$ of the friction coefficient $\mu$ with respect to the slip rate (i.e., the slope of the tangent line at an arbitrary point on the curve showing the relationship between the friction coefficient $\mu$ and the slip rate) is used, the value of the slip speed divided by the average wheel speed $v_a$ of the four wheels becomes the slip rate. The relationship between the $\beta_n$ and $v_a$ in expression (8) enables expression (4) above to be expressed with expression (9) below.

$$\alpha_n = \frac{\beta_n}{v_a} \qquad (8)$$

$$\Delta_n = \frac{k_{fn}v_a}{W_n\beta_n}s^2 M x_v + \left(\frac{r_n^2}{K_{tn}} + \frac{1}{K_{sn}}\right)k_{fn}s^3 M x_v \qquad (9)$$
$$= \frac{k_{fn}v_a}{k_{wn}\beta_n}g_v + \frac{k_{fn}}{k_{stn}}d_v$$

When considering the wheel speed difference $\Delta_{nm}$ (=slip speed $\Delta_n$–slip speed $\Delta_m$) between any two wheels, the vehicle body speed $v_v$ is not considered, as can be seen in expression (10) below.

$$\Delta_{nm} = \Delta_n - \Delta_m = v_n - v_m \qquad (10)$$
$$= r_n s\theta_n - r_m s\theta_m = r_n w_n - r_m w_m$$
$$= \left(\frac{k_{fn}v_a}{k_{wn}\beta_n} - \frac{k_{fm}v_a}{k_{wm}\beta_m}\right)g_v + \left(\frac{k_{fn}}{k_{stn}} - \frac{k_{fm}}{k_{stm}}\right)d_v$$

When the vehicle is in the normal running state, the slip speed $\Delta_n$ of each wheel is small, so that wheel speed difference $\Delta_{nm}$ is also small. It has been confirmed by measurement that the wheel speed difference is approximately 0.1 [m/s] when the vehicle body acceleration rate is approximately 0.2 [G] (1.96 [m/s²]). This value is approximately 0.7 [%] of a vehicle speed of 50 [km/h] (13.9 [m/s]). Therefore, it is necessary that the value for the tire radius $r_n$, which is a conversion coefficient from wheel rotation speed to translational speed, be extremely accurate.

Therefore, in this exemplary embodiment, the tire radius is also considered an estimation parameter. If one of the four wheels is made a reference wheel, and the radius of this reference wheel made $R_0$, and the ratios of other tires to the radius $R_0$ of the reference tire made $k_{rn}$, expression (10) above can be expressed as expression (11) below.

$$R_0(k_{rn}\omega_n - k_{rm}\omega_m) = \left(\frac{k_{fn}v_a}{k_{wn}\beta_n} - \frac{k_{fm}v_a}{k_{wm}\beta_m}\right)g_v + \left(\frac{k_{fn}}{k_{stn}} - \frac{k_{fm}}{k_{stm}}\right)d_v \qquad (11)$$

An unknown parameter is estimated using expression (11) above. In many vehicles, the distribution ratio $k_{rn}$ of the braking force, as well as of the driving force during acceleration, is often set beforehand. On the other hand, in the case of a vehicle where the distribution ratio $k_{rn}$ is variable, it can be set by measuring or detecting the distribution ratio $k_{rn}$ of each wheel. If a static distribution ratio (i.e., a distribution ratio of when the vehicle is stopped) is set, it is possible to obtain the load distribution ratio $k_{wn}$ on each wheel during acceleration and deceleration with a correction using the vehicle acceleration rate.

Thus, when the known variables and unknown variables are separated and summed up in the form of a matrix, expression (12) below is obtained. In expression (12), a matrix of one line is made up of known variables, and a matrix of one column is made up of unknown variables.

$$\left[-R_0 w_n \quad R_0 w_m \quad \frac{k_{fn}v_a g_v}{k_{wn}} \quad -\frac{k_{fm}v_a g_v}{k_{wm}} \quad k_{fn}d_v \quad -k_{fm}d_v\right]\begin{bmatrix} K_{rn} \\ K_{rm} \\ \frac{1}{\beta_n} \\ \frac{1}{\beta_m} \\ \frac{1}{k_{stn}} \\ \frac{1}{k_{stm}} \end{bmatrix} = 0 \qquad (12)$$

With the four wheels of the vehicle (i.e., the front right (FR), front left (FL), rear right (RR), and rear left (RL)), there are a total of six possible combinations of any two wheels, with four front-rear wheel combinations. Here, the combinations of FR-RR, FL-RL, FR-RL will be considered, but the selection of the wheels, however, is not limited to this. Accordingly, the unknown variables are obtained based on the wheel speed difference between any two wheels during acceleration and deceleration of the vehicle.

If a number n of FR, RL, RR, and RL, is made 0, 1, 2, and 3, respectively, then $$\begin{bmatrix} -a_{00} & 0 & a_{02} & 0 & a_{10} & 0 & -a_{12} & 0 & a_{20} & 0 & -a_{22} & 0 \\ 0 & -a_{01} & 0 & a_{03} & 0 & a_{11} & 0 & -a_{13} & 0 & a_{21} & 0 & -a_{23} \\ -a_{00} & 0 & 0 & a_{03} & a_{10} & 0 & 0 & -a_{13} & a_{20} & 0 & 0 & -a_{23} \end{bmatrix} \begin{bmatrix} x_{00} \\ x_{01} \\ x_{02} \\ x_{03} \\ x_{10} \\ x_{11} \\ x_{12} \\ x_{13} \\ x_{20} \\ x_{21} \\ x_{22} \\ x_{23} \end{bmatrix} = \begin{bmatrix} 0 \\ 0 \\ 0 \end{bmatrix} \qquad (13)$$

wherein,

-continued $$a_{0n} = R_0 w_n, \quad a_{1n} = \frac{k_{fn} v_a g_v}{k_{wn}}, \quad a_{2n} = k_{fn} d_v, \quad x_{0n} = k_{rn}, \quad x_{1n} = \frac{1}{\beta_n}, \quad x_{2n} = \frac{1}{k_{stn}} \quad (14)$$

Here, if the FR wheel (n=0) is made the reference tire and the tire radius of this reference tire is made the reference tire radius, then $x_{00}=k_{r0}=1$, so the matrix is reduced one dimension, and expression (15) below is obtained.

$$\begin{bmatrix} 0 & a_{02} & 0 & a_{10} & 0 & -a_{12} & 0 & a_{20} & 0 & -a_{22} & 0 \\ -a_{01} & 0 & a_{03} & 0 & a_{11} & 0 & -a_{13} & 0 & a_{21} & 0 & -a_{23} \\ 0 & 0 & a_{03} & a_{10} & 0 & 0 & -a_{13} & a_{20} & 0 & 0 & -a_{23} \end{bmatrix} \begin{bmatrix} x_{01} \\ x_{02} \\ x_{03} \\ x_{10} \\ x_{11} \\ x_{12} \\ x_{13} \\ x_{20} \\ x_{21} \\ x_{22} \\ x_{23} \end{bmatrix} = \begin{bmatrix} a_{00} \\ 0 \\ a_{00} \end{bmatrix} \quad (15)$$

At a certain point i, expression (15) takes the form of expression (16) below.

$$AiX = Yi \quad (16)$$

Regarding time-series data, expression (17) below is obtained.

$$AX = Y, \quad A = \begin{bmatrix} \vdots \\ A_{i-1} \\ A_i \end{bmatrix}, \quad Y = \begin{bmatrix} \vdots \\ Y_{i-1} \\ Y_i \end{bmatrix} \quad (17)$$

Therefore, from expression (18) below, in which a transposed matrix AT in expression (17) above multiplied to both sides from the left, the unknown parameter X can be estimated as expression (19) below in batch using the least-squares method.

$$A^T A X = A^T Y \quad (18)$$

$$X = (A^T A)^{-1} A^T Y \quad (19)$$

With on line estimation, if the forgetting coefficient is made $\rho$, $(A^T A)$ at the point i is made $B_i$ and $(A^T Y)$ at the point i is made $Z_i$, then expression (20) below can be obtained.

$$B_i = A^T A = \rho B_{i-1} + A_i^T A_i$$

$$Z_i = A^T Y = \rho Z_{i-1} + A_i^T Y_i \quad (20)$$

Therefore, an estimated value $X_i$ at the point i can be obtained as expression (21) below.

$$X_i = B_i^{-1} Z_i \quad (21)$$

Matrix $B_i$ is a symmetrical matrix, which can be solved relatively easily using the Modified Cholesky Method or the like.

As a result, it is possible to estimate the radius ratio $k_{rn}$ of a tire other than the reference tire, to the radius of the reference tire for each of the four wheels, with the distribution ratio of the load on each wheel that has been corrected according to the acceleration and deceleration rate, and the distribution ratio of the braking force and driving force to each wheel, as a known values. It is also possible to estimate the reciprocal $1/\beta_n$ of the road surface $\mu$ gradient with respect to the slip rate, as well as the reciprocal $1/k_{stn}$ of the spring constant of the combination spring that has been standardized by dividing the spring constant of the combination spring by the vehicle body weight. Furthermore, using the estimated tire radius ratio $k_{rn}$ and the reference tire radius, it is possible to estimate the tire radius of each wheel. Also, the road surface $\mu$ gradient can be estimated from the estimated reciprocal $1/\beta_n$ of the road surface $\mu$ gradient. Moreover, the spring constant of the combination spring can be estimated from the reciprocal $1/k_{stn}$ of the spring constant of the combination spring. Here, the FR, FL, RR, and RL are expressed with n=0, 1, 2, 3, respectively, as described above.

Figure 3A:
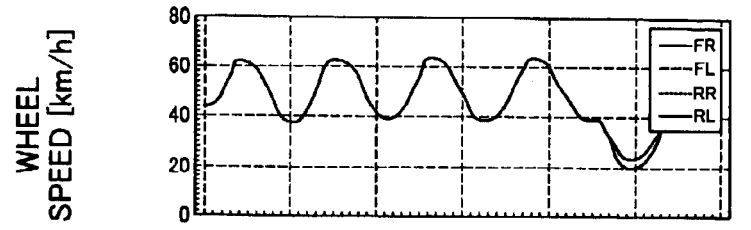
FIG. 3A is a line graph showing a change over time in wheel speed.
Figure 3B:
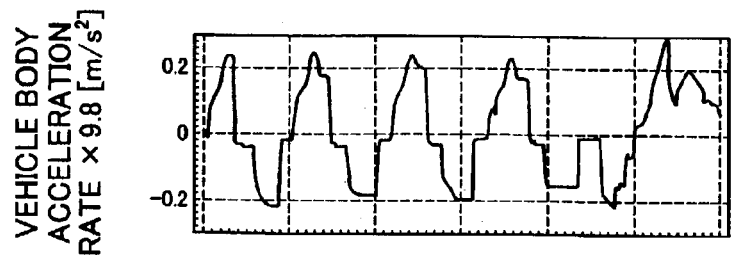
FIG. 3B is a line graph showing a change over time in a vehicle body acceleration rate.
Figure 3C:
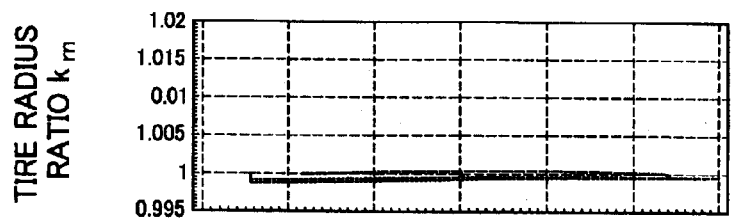
FIG. 3C is a line graph that shows a change over time in a tire radius ratio $k_{rn}$, which is an estimation parameter.
Figure 3D:
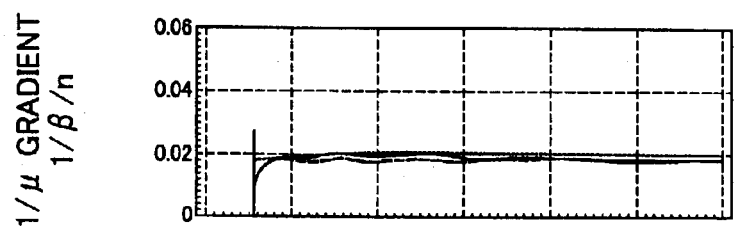
FIG. 3D is a line graph showing a change over time in a reciprocal $1/\beta_n$ of a $\mu$ gradient.
Figure 3E:
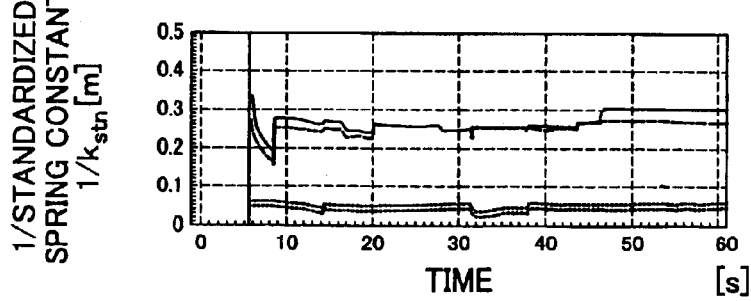
FIG. 3E is a line graph showing a change over time to a reciprocal $1/k_{sm}$ of a combination spring constant standardized by the vehicle body weight.
Figure 4A:
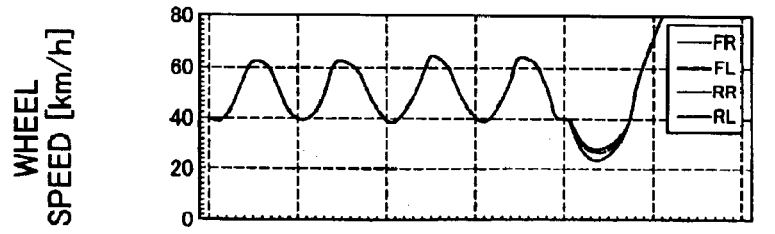
FIG. 4A is a line graph showing a change over time in wheel speed.
Figure 4B:
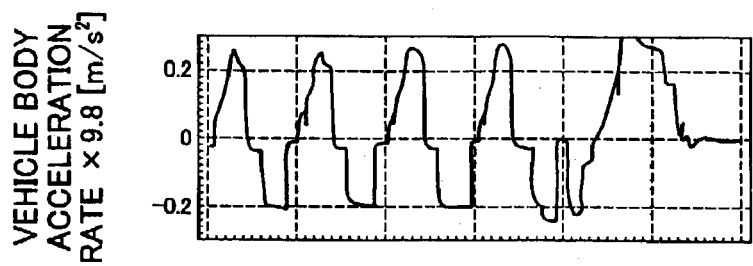
FIG. 4B is a line graph showing a change over time in a vehicle body acceleration rate.
Figure 4C:
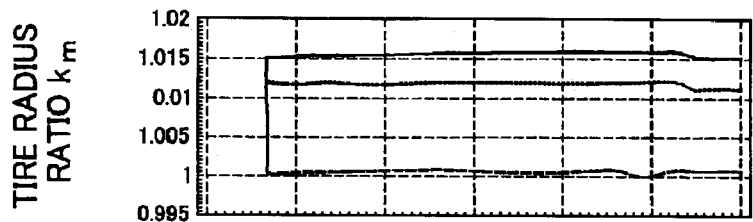
FIG. 4C is a line graph showing a change over time in the tire radius ratio $k_{rn}$, which is an estimation parameter.
Figure 4D:
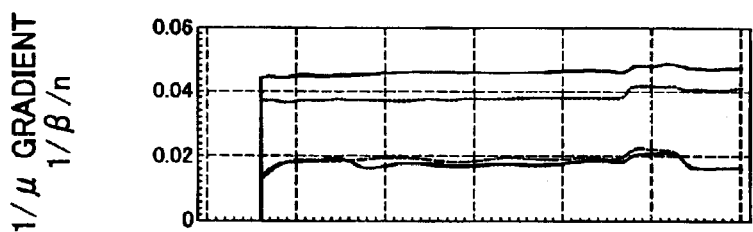
FIG. 4D is a line graph showing a change over time in the reciprocal $1/\beta_n$ of the $\mu$ gradient.
Figure 4E:
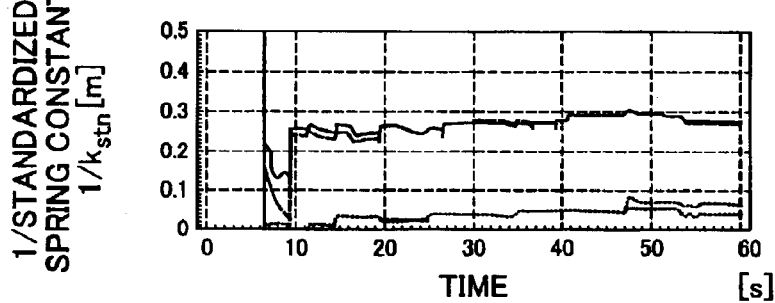
FIG. 4E is a line graph showing a change over time to the reciprocal $1/k_{sm}$ of the combination spring constant standardized by the vehicle body weight.
Figure 6:
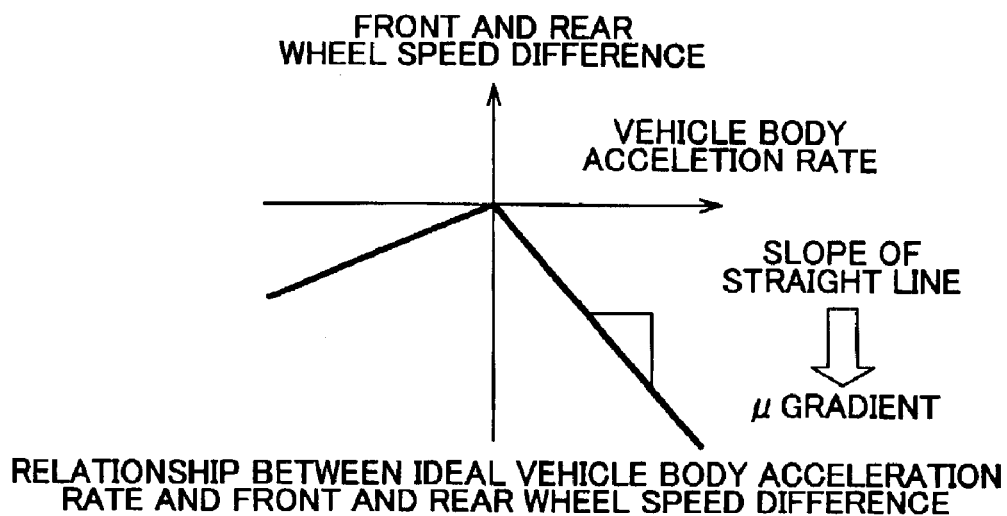
FIG. 6 is a line graph showing an relationship between an ideal vehicle body acceleration rate and front and rear wheel speed difference.
Figure 7:
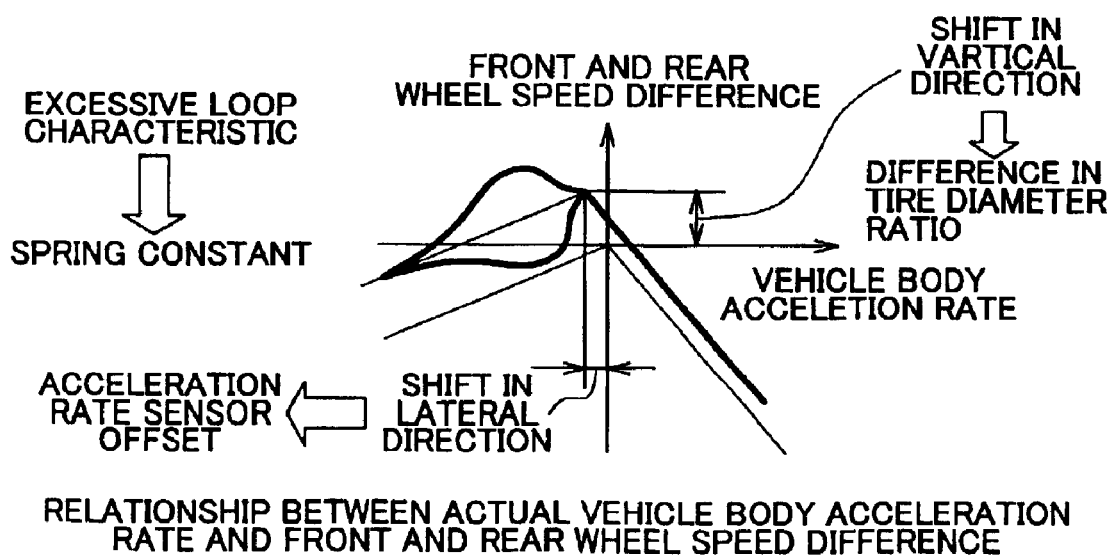
FIG. 7 is a line graph showing a relationship between an actual vehicle body acceleration rate and front and rear wheel speed difference.

Next, the test results of estimating the parameters of $k_{rn}$, $1/\beta_n$, and $1/k_{stn}$, of a test in which this exemplary embodiment was applied to an actual vehicle will be described. FIGS. 3 and 4 show the estimation results of the test in which the vehicle was repeatedly accelerated and decelerated on a dry asphalt road (i.e., a high $\mu$ road), with an average vehicle speed being 50 [km/h]. The test vehicle is a rear wheel drive AT (automatic transmission). FIG. 3 shows the estimation results when all four wheels have been fitted with summer tires, and FIG. 4 shows the estimation results when the front wheels have been fitted with summer tires and the rear wheels have been fitted with studless tires. In FIGS. 3 and 4, FIGS. 3A and 4A show the wheel speed, FIGS. 3B and 4B show the vehicle body acceleration rate, FIGS. 3C and 4C show the tire radius ratio $k_{rn}$, FIGS. 3D and 4D show the reciprocal $1/\beta_n$ of the $\mu$ gradient with respect to the slip rate, and FIGS. 3E and 4E show the change over time in the reciprocal $1/k_{stn}$ of the combination spring constant (i.e., the spring constant of the combination spring in which the tire torsional spring and the suspension longitudinal spring are connected in series) that has been standardized by the vehicle body weight.

The maximum acceleration rate of the vehicle body is approximately 0.2 [G] (1.96 [m/s$^2$]). A threshold value $G_{min}$ of the acceleration rate was set to 0.02 [G] (0.196)m/s$^2$]). The calculation was performed when the acceleration rate equal to, or greater than, this threshold value was reached.

Decimation of 1/10 was performed after filter processing using a Butterworth two dimension filter, which is a preprocessing filter, or low pass filter, (LPF) for the wheel speed and vehicle body acceleration rate that has a cutoff frequency of 5 [Hz]. The forgetting coefficient was made 0.99654 (two hundredth root of 0.5) so as to be reduced by half at 10 [s].

The distribution ratio $k_{fn}$ of the braking and driving force of the front and rear wheels during braking is: front wheels 0.325, rear wheels 0.175. During braking, it is front wheels 0.000, rear wheels 0.500.

$$k_{fn} = \begin{cases} 0.325 & \cdots \text{ front wheels} \\ 0.175 & \cdots \text{ rear wheels} \end{cases}$$

$$k_{fn} = \begin{cases} 0.000 & \cdots \text{ front wheels} \\ 0.500 & \cdots \text{ rear wheels} \end{cases}$$

These switched based on the STP signal, which is linked to the brake pedal. Further, the distribution ratio $k_{wn}$ of the loads on each of the wheels FR, FL, RR, and RL, is shown with respect to the ratio $g_v$ of the vehicle body acceleration rate in the expression below.

$$k_{wn} = \begin{cases} 0.268 + 0.1 \times g_v & \cdots FR \\ 0.240 + 0.1 \times g_v & \cdots FL \\ 0.249 - 0.1 \times g_v & \cdots RR \\ 0.243 - 0.1 \times g_v & \cdots RL \end{cases}$$

The size of the summer tires is 225/55R16 and the size of the studless tires is 215/60R16. The calculated values for each tire radius ratio $k_{wn}$ are as shown in the expression below.

225/55*R16*:

$$225[\text{mm}] \times 0.55[\%] + \frac{16[\text{inch}]}{2} \times 25.4[\text{mm/inch}] = 327[\text{mm}]$$

215/60*R16*:

$$215[\text{mm}] \times 0.60[\%] + \frac{16[\text{inch}]}{2} \times 25.4[\text{mm/inch}] = 332[\text{mm}]$$

The estimated value of the tire radius ratio $k_{rn}$ is approximately 1 for the summer tires on all four wheels, and approximately 332 [mm]/327 [mm]=1.015 for the studless tires on the rear wheels, so it is apparent that an appropriate value was able to be estimated. The difference in the radius of the summer tires and the studless tires is approximately 5 [mm]. Because a sufficiently accurate estimation is able to be made, the difference in radius can also be used to estimate a change in the radius due to the energy load, or the like.

As shown in FIG. 4C, the radius ratio with the studless tire on the RR wheel is estimated to be slightly small. This is thought to be due to the fact that the tire might have worn. However, as shown in FIG. 4D, the estimated $\mu$ gradient value is closer to the characteristics of the summer tire.

From the test results above, the value of the gradient $\beta_n$ of the friction coefficient $\mu$ with respect to the slip rate is approximately 50 with the summer tires and 25 with the studless tires. Also, it can be understood that the deviation of the estimated value is small and a substantially constant value is able to be estimated for the speed of each wheel.

Here, when the spring elements of the tire and the suspension are not taken into consideration, the expression for the wheel speed difference corresponding to expression (10) is as follows.

$$\Delta nm = \left( \frac{k_{fn} v_a}{k_{wn} \beta_n} - \frac{k_{fm} v_a}{k_{wm} \beta_m} \right) g_v \tag{22}$$

That is, the vehicle body acceleration rate $g_v$ and the wheel speed difference $\Delta_{nm}$ show the proportional relationship as long as the distribution ratio of the braking and driving force and the distribution ratio of the load do not change. FIG. 5A is a graph plotting the characteristics of the vehicle body acceleration rate $g_v$ and the wheel speed difference $\Delta_{nm}$. A hysteresis characteristic which makes a loop is clearly evident in the negative region (i.e., the braking region) of the vehicle body acceleration rate $g_v$.

If expression (10) which considers the derivative of the acceleration rate $d_v$ of the vehicle body is modified and a certain amount of the proportional relationship with respect to the vehicle body acceleration rate is defined as a pseudo wheel speed difference $\Delta'_{nm}$, then the pseudo wheel speed difference $\Delta'_{nm}$ is expressed with the expression (23) below.

$$\Delta'_{nm} = \Delta_{nm} - \left( \frac{k_{fn}}{k_{stn}} - \frac{k_{fn}}{k_{stn}} \right) d_v = \left( \frac{k_{fn} v_a}{k_{wn} \beta_n} - \frac{k_{fm} v_a}{k_{wm} \beta_m} \right) g_v \tag{23}$$

FIG. 5B is a graph plotting the characteristics of the pseudo wheel speed difference $\Delta'_{nm}$ that was corrected with the above expression, with respect to the vehicle body acceleration rate $g_v$. It is evident that the hysteresis characteristic which made the loop during braking disappears and a line type characteristic appears in its place.

The spring constants of the tire torsional spring element and the suspension longitudinal spring element, which are estimated from the general specifications obtained from the test results up until this point, a tire unit weight of 30 [kg], radius of 0.33 [m], inertia moment 1.4 [kgm²], tire torsional resonance frequency of 40 [Hz], and suspension longitudinal resonance frequency of 15 [Hz], are approximately $8.1 \times 10^5$ [N/m] for the tire torsional spring element and $2.7 \times 10^5$ [N/m] for the suspension longitudinal spring element, as shown in the following equation.

Tire torsional spring:

$$(40 \text{ [Hz]} \times 2\pi)^2 \times \frac{1.4 \text{ [kg m}^2\text{]}}{(0.33 \text{ [m]})^2} = 8.1 \times 10^5 \text{ [N/m]}$$

Suspension longitudinal spring:

$$(15 \text{ [Hz]} \times 2\pi)^2 \times 30 \text{ [kg]} = 2.7 \times 10^5 \text{ [N/m]}$$

If the spring constants are standardized by the test vehicle weight of 2133 [kg]×9.8 [m/s²]=$2.1 \times 10^4$ [N] and the reciprocal calculated, that reciprocal is 0.026 [m] for the tire torsional spring element and 0.078 [m] for the suspension longitudinal spring element. Because the reciprocal $1/k_{stn}$ of the spring constant of the combination spring is the sum of these, it has a value of approximately 0.1 [m]. In the test, because relatively slow braking and driving was repeated, there was a large amount of sinking in the suspension of the front wheel. It is assumed that the spring element in the vertical direction in the suspension in the front wheel also added to this. It is conceivable that these factors make the value of the estimated reciprocal $1/k_{stn}$ of the combination spring constant at a substantially appropriate value.

As described above, in this exemplary embodiment, an ideal vehicle model is made taking into consideration the tire torsional spring element and the suspension longitudinal spring element when estimating the $\mu$ gradient from the movement of the vehicle when it is accelerating and decelerating. As a result, the cause of the loop shaped hysteresis characteristic that was seen particularly during braking, in the vehicle body acceleration rate and wheel speed difference characteristics become apparent, thereby enabling improved accuracy in estimating the physical quantity of the $\mu$ gradient or the like, by correcting the hysteresis characteristic.

Further, when calculating the wheel speed difference between the two wheels, it is apparent that accurate radius information for each tire is necessary. In this exemplary embodiment, the radius information was included as an estimated parameter. As a result, the ability to estimate the tire radius information of an appropriate value was able to be confirmed. These methods were applied to the test results of accelerating and decelerating with the test vehicle. The validity thereof was verified, and a basic principle of a tire type determination method using the $\mu$ gradient estimated value during acceleration and deceleration was constructed.

The aforementioned exemplary embodiment was described above using an example in which the $\mu$ gradient, the tire spring constant (i.e., the spring constant of the combination spring), and the tire radius, are estimated as parameters. By storing any one of these arbitrary values as a known value in the constant memory, however, it is also possible to select and estimate an arbitrary parameter. For example, it is possible to estimate only the $\mu$ gradient if the tire spring constant and the tire radius are known. When the tire type and the road surface are known, for example, it is also possible to estimate only the tire radius if the $\mu$ gradient and the tire spring constant are known.

As described above, with the physical quantity estimating apparatus 14 of this exemplary embodiment, because the tire radius, the road surface $\mu$ gradient, and the combination spring constant are all estimated simultaneously, it is possible to determine the tire type, a change in tire air pressure, and tire wear, and the like, with the tire state determining apparatus 18 using the estimated parameters, as described below.

Figure 9:
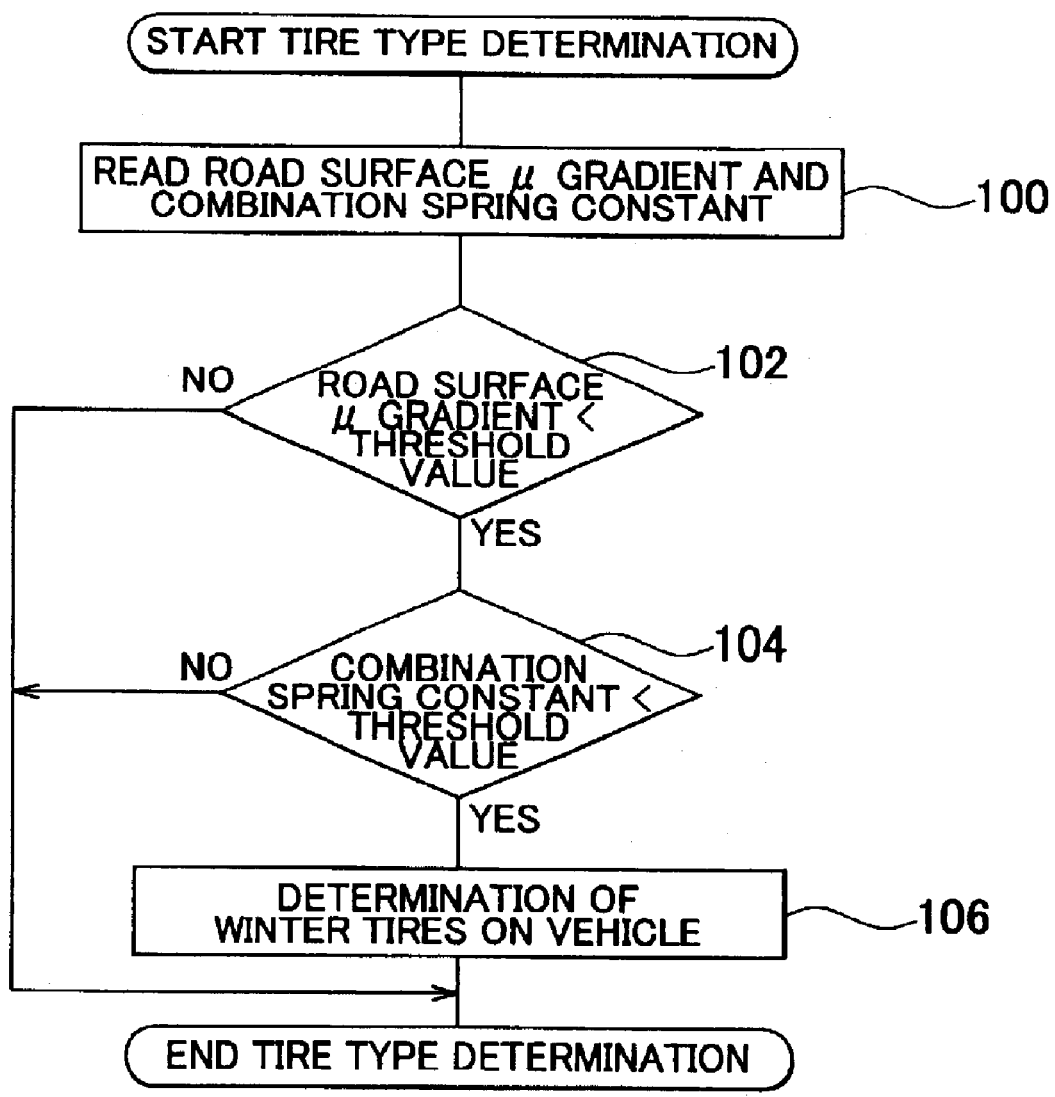
FIG. 9 is a flowchart showing a tire type determining routine.

First, the tire type determination using the estimated parameters, which is executed by the tire state determining apparatus 18 will be described. Among the estimated parameters, the tire spring constant and the road surface $\mu$ gradient change remarkably depending on the tire type. It is therefore possible to determine the tire type using the difference in these values. For example, when the vehicle is fitted with winter tires, the $\mu$ gradient estimated value is relatively small and the spring coefficient is also small, compared with when the vehicle is fitted with summer tires. As shown in steps 100 through 106 in the tire type determination routine in FIG. 9, after the tire combination spring constant and the road surface $\mu$ gradient have been read, the estimated values of the tire combination spring constant and the road surface $\mu$ gradient are compared with thresholds set corresponding to each. If both the tire combination spring constant and the road surface $\mu$ gradient is less than the threshold value, it can be determined that the vehicle is fitted with winter tires.

As will be described below, it is possible to determine the tire type in the same way as described above also using only one of the road surface $\mu$ gradient and the tire spring constant. Using both, however, as in this exemplary embodiment, makes it possible to determine the tire type with even greater accuracy.

Figure 10:
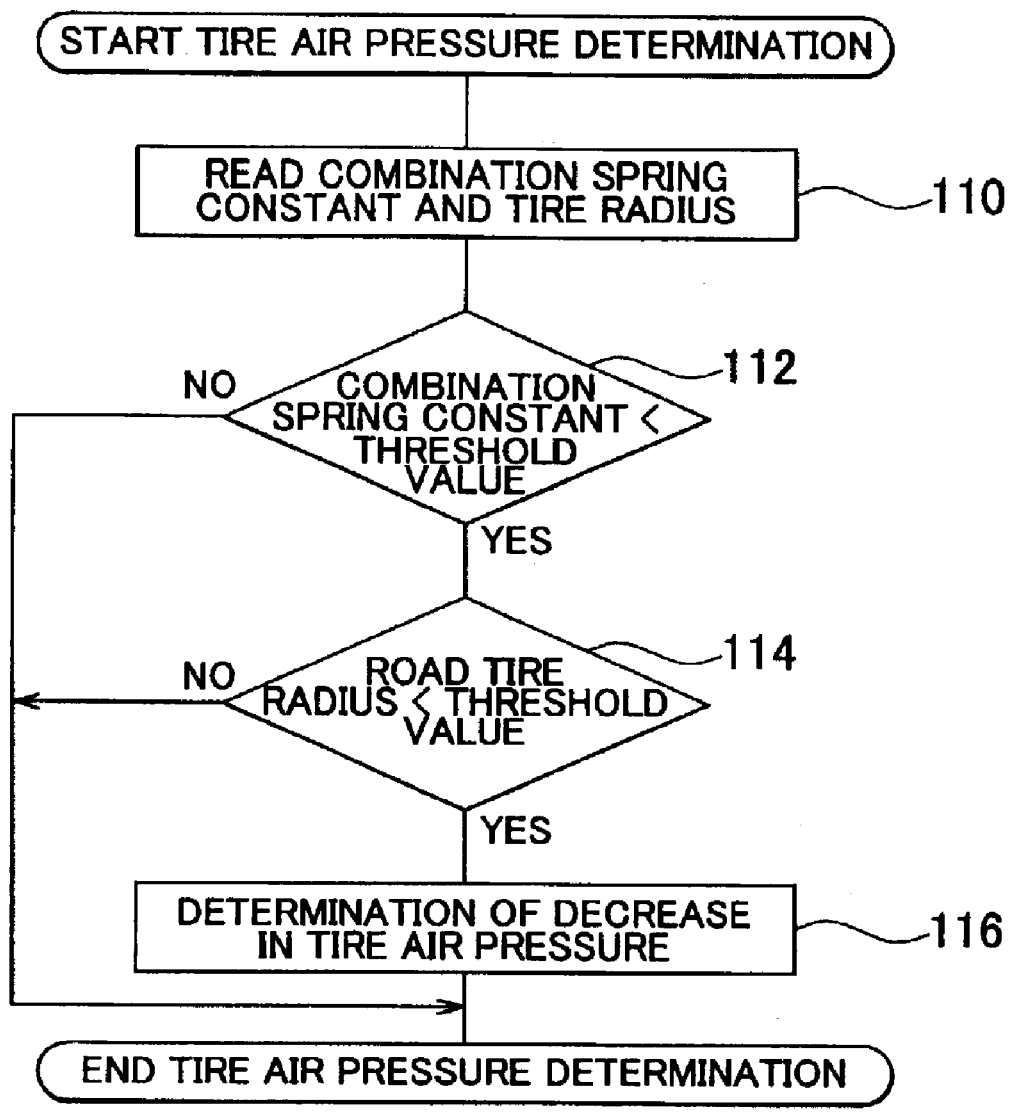
FIG. 10 is a flowchart showing a tire air pressure determining routine.

Next, the tire air pressure determination using the estimated parameters, which is executed by the tire state determining apparatus 18 will be described. Among the estimated parameters, the tire spring constant and the tire radius change remarkably depending on the change in the tire air pressure. It is therefore possible to determine the tire air pressure by the change in these values. For example, the spring constant and the tire radius are both small in a tire in which the air pressure has decreased with respect to the reference air pressure. Therefore, as shown in steps 110 through 116 in the tire air pressure determination routine in FIG. 10, the tire state determining apparatus reads the spring constant and the tire radius while the vehicle is in the normal running state, and compares the combination spring constant and the tire radius with thresholds set corresponding to each. If both the spring constant and the tire radius are less than their respective thresholds for any one or plurality of wheels, it can be determined that the tire air pressure has decreased.

As will be described below, it is possible to determine a decrease in tire air pressure in the same way as described above using only one of the tire spring constant and the tire radius information. Using both, however, as in this exemplary embodiment, makes it possible to determine the air pressure with even greater accuracy.

Next, the tire wear state determination using the estimated parameters, which is executed by the tire state determining apparatus 18 will be described. Among the estimated parameters, the tire radius and the road surface $\mu$ gradient change remarkably depending on the tire wear. It is therefore possible to determine the tire wear by determining the change in these values. For example, when the vehicle is initially fitted with winter tires, the $\mu$ gradient value is lower than it is with summer tires, and it is easy to determine that wear has not occurred. As the running distance of the vehicle increases, however, the tire radius decreases and the $\mu$ gradient changes greatly. Therefore, as shown in steps 120 through 126 in the tire wear state determination routine in FIG. 11, the tire state determining apparatus reads the tire radius and the road surface $\mu$ gradient. Wear of the tire can be detected by determining if the tire radius has become equal to, or less than, the threshold, and the road surface $\mu$ gradient has changed to become equal to, or greater than, the threshold.

It is possible to determine wear of the tire in the same way as described above using only one of the $\mu$ gradient and the tire radius information. Using both, however, as in this exemplary embodiment, makes it possible to determine the the tire wear with even greater accuracy.

Next, a simple determination method for determining one of the tire type, the tire air pressure, and the tire wear state from at least one physical quantity of the tire radius, the road surface friction coefficient, and the spring constant of the combination spring, will be described.

Figure 8:
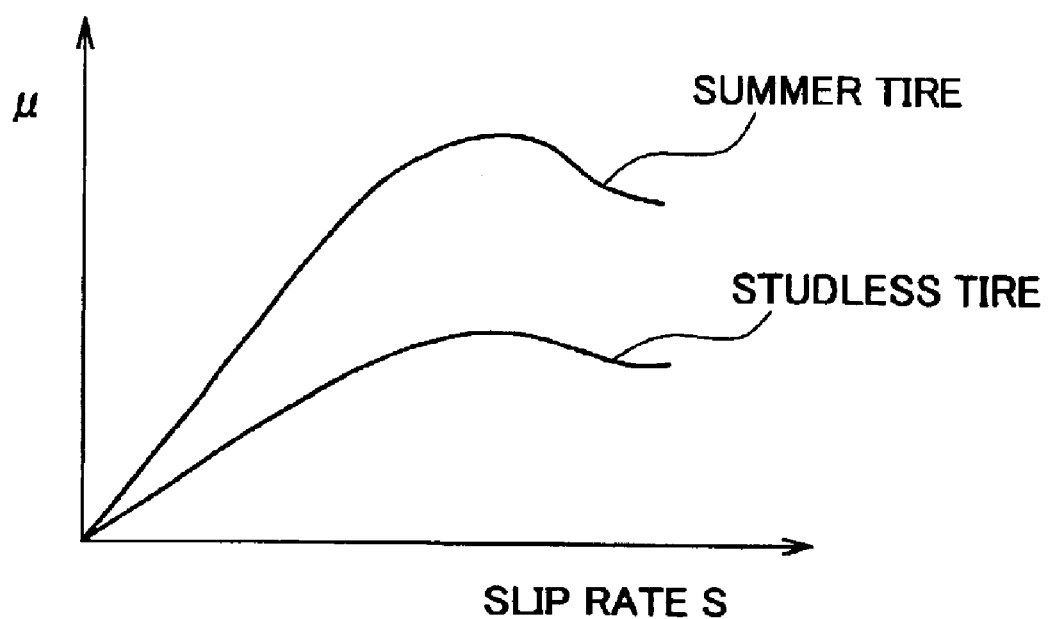
FIG. 8 is a line graph showing a relationship between slip rates with a summer tire and a studless tire, and a road surface $\mu$.

A case in which the tire type is determined using the summer tire and the studless tire as examples will be described. When the summer tire is compared with the studless tire, the road surface $\mu$ gradient is larger with the summer tire when the slip rate is near 0, as is shown in FIG. 8. Also, the spring constant of the combination spring is larger with the summer tire. It is therefore possible to determine the tire type from the size of the road surface $\mu$ gradient or the size of the spring constant of the combination spring. Further, when the summer tire is compared with the studless tire, because the tire radius ratio is larger with the studless tire, it is possible to determine the tire type from the size of the tire radius ratio.

Next, an example in which the tire air pressure is detected based on the road surface $\mu$ gradient, the tire radius ratio, or the spring constant of the combination spring will be described. When comparing the tire radius ratio and the spring constant of the combination spring when the tire air pressure is high with the tire radius ratio and the spring constant of the combination spring when the tire air pressure is low, the tire radius ratio and the spring constant of the combination spring were both larger when the air pressure is high. Therefore, it is possible to determine the tire air pressure from the size of the tire radius ratio or the size of the spring constant of the combination spring. Further, when comparing the road surface $\mu$ gradient when the tire air pressure is high with the road surface $\mu$ gradient when the tire air pressure is low, the road surface $\mu$ gradient is larger when the tire air pressure is low. As a result, it is possible to determine the tire air pressure from the size of the road surface $\mu$ gradient.

Now, an example in which the tire wear is detected based on the road surface $\mu$ gradient, the tire radius ratio, or the spring constant of the combination spring will be described. With the studless tire, the road surface $\mu$ gradient and the spring constant of the combination spring increase as the tire wears. Therefore, it is possible to determine the tire wear state from the size of the road surface $\mu$ gradient, or the spring constant of the combination spring. Also with the studless tire, the tire radius ratio decreases as the tire wears, so it is possible to determine the tire wear state from the size of the tire radius ratio.

These determined states of the tire can be made known to an occupant by a notifying apparatus 19. This notifying apparatus 19 may be an indicator that notifies the occupant of the determination results by light, or a buzzer that notifies the occupant of the determination results by sound. Moreover, the notifying apparatus 19 may also be a display provided in a console, which displays the determination results.

The physical quantity estimating apparatus according to this invention as described above, estimates a physical quantity using an ideal vehicle model which takes into consideration the tire torsional spring element and the suspension longitudinal element. As a result, the physical quantity estimating apparatus of this invention is able to estimate the physical quantity in order to determine with high accuracy at least one of the tire type, the change in tire air pressure, and the tire wear state.

Further, the tire state determining apparatus according to this invention uses the physical quantity estimated using the ideal vehicle model which takes into consideration the tire torsional spring element and the suspension longitudinal element so as to be able to determine with high accuracy at least one of the tire type, the change in tire air pressure, and the tire wear state.

In this exemplary embodiment, an ideal vehicle model is used that takes into consideration the tire torsional spring element and the suspension longitudinal element. Alternatively, however, an ideal vehicle model that takes into consideration the difference in tire radius may be used. Also, an ideal vehicle model that takes into consideration the tire torsional spring element and the suspension longitudinal element may be used to estimate the physical quantity relating to the spring constant of the combination spring. Also, an ideal vehicle model that takes into consideration the difference in the tire radius may be used to estimate the physical quantity relating to the tire radius. Accordingly, it is possible to estimate each of the values with high accuracy.

Moreover, an ideal vehicle model that takes into consideration the both the tire torsional spring element and the suspension longitudinal element and the difference in tire radius may be used.

The physical quantity estimating apparatus 14 and the tire state determining apparatus 18 of the illustrated exemplary embodiment are implemented as one or more programmed general purpose computers. They will be appreciated by those skilled in the art that the apparatus can be implemented using a single special purpose integrated circuit (e.g., ASIC) having a main or central processor section for overall, system-level control, and separate sections dedicated to performing various different specific computations, functions and other processes under control of the central processor section. The apparatus can be a plurality of separate dedicated or programmable integrated or other electronic circuits or devices (e.g., hardwired electronic or logic circuits such as discrete element circuits, or programmable logic devices such as PLDs, PLAs, PALs or the like). The apparatus can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the apparatus. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the invention are shown in various combinations and configurations, which are exemplary, other combinations and configurations, including more less or only a single element, are also within the spirit and scope of the invention.

What is claimed is:

1. A physical quantity estimating apparatus, comprising:
an estimating portion that estimates at least one of a physical quantity relating to a tire radius of each wheel, a physical quantity relating to a road surface friction coefficient, and a physical quantity relating to a spring constant of a combination spring which combines spring elements, using a known value of a distribution ratio of a braking force and a driving force to each wheel and a known value of a distribution ratio of a load on each wheel, based on a wheel speed difference between any two wheels and the acceleration and deceleration rate of the vehicle during acceleration and deceleration of the vehicle.

2. The physical quantity estimating apparatus according to claim 1, wherein the physical quantity relating to the spring constant of the combination spring which combines spring elements of each wheel is estimated using the known value of the distribution ratio of the braking force and driving force to each wheel and the known distribution ratio of the load on each wheel, based on the wheel speed difference between any two wheels and the acceleration and deceleration rate of the vehicle during acceleration and deceleration of the vehicle, of an ideal vehicle model that takes into consideration a tire torsional spring element and a suspension longitudinal spring element of the vehicle.

3. The physical quantity estimating apparatus according to claim 2, further comprising:
a first detector that detects the acceleration and deceleration rate of the vehicle, and
a second detector that detects a wheel speed of the vehicle in order to obtain the wheel speed difference.

4. The physical quantity estimating apparatus according to claim 2, wherein the physical quantity relating to the tire radius is one of a radius ratio of a tire other than a reference tire to a radius of the reference tire and the tire radius obtained from the radius ratio, the physical quantity relating to the road surface friction coefficient is one of a reciprocal of a road surface friction coefficient gradient with respect to a slip rate and the road surface friction coefficient gradient obtained from the reciprocal, and the physical quantity relating to the spring constant is one of a reciprocal of the spring constant of a combination spring standardized by dividing the spring constant of the combination spring by a vehicle body weight and the spring constant of the combination spring obtained from the reciprocal of the spring constant.

5. The physical quantity estimating apparatus according to claim 1, wherein the physical quantity relating the tire radius of each wheel is estimated using a known value of the distribution ratio of the braking force and driving force to each wheel, and the known distribution ratio of the load on each wheel, based on the wheel speed difference between any two wheels and the acceleration and deceleration rate of the vehicle, during acceleration and deceleration of the vehicle, of an ideal vehicle model that takes into consideration a difference in the tire radius of the vehicle.

6. The physical quantity estimating apparatus according to claim 5, further comprising:
   a first detector that detects the acceleration and deceleration rate of the vehicle; and
   a second detector that detects a wheel speed of the vehicle in order to obtain the wheel speed difference.

7. The physical quantity estimating apparatus according to claim 5, wherein the physical quantity relating to the tire radius is one of a radius ratio of a tire other than a reference tire to a radius of the reference tire and the tire radius obtained from the radius ratio, the physical quantity relating to the road surface friction coefficient is one of a reciprocal of a road surface friction coefficient gradient with respect to a slip rate and the road surface friction coefficient gradient obtained from the reciprocal, and the physical quantity relating to the spring constant is one of a reciprocal of the spring constant of a combination spring standardized by dividing the spring constant of the combination spring by a vehicle body weight and the spring constant of the combination spring obtained from the reciprocal of the spring constant.

8. A tire state determining apparatus, comprising:
   an estimating portion that estimates at least one of a physical quantity relating to a tire radius of each wheel, a physical quantity relating to a road surface friction coefficient, and a physical quantity relating to a spring constant of a combination spring which combines spring elements, using a known value of a distribution ratio of a braking force and a driving force to each wheel and a known distribution ratio of a load on each wheel, based on a wheel speed difference between any two wheels and the acceleration and deceleration rate of a vehicle during acceleration and deceleration of the vehicle; and
   a determining portion that determines at least one of a tire type, a tire air pressure, and a tire wear state, based on at least one of the physical quantities estimated by the estimating portion.

9. The tire state determining apparatus according to claim 8, wherein the physical quantity relating to the spring constant of the combination spring which combines spring elements of each wheel is estimated using the known value of the distribution ratio of the braking force and driving force to each wheel and the known distribution ratio of the load on each wheel, based on the wheel speed difference between any two wheels and the acceleration and deceleration rate of the vehicle, during acceleration and deceleration of the vehicle, of an ideal vehicle model that takes into consideration a tire torsional spring element and a suspension longitudinal spring element of the vehicle.

10. The tire state determining apparatus according to claim 9, further comprising:
    a first detector that detects the acceleration and deceleration rate of the vehicle; and
    a second detector that detects a wheel speed of the vehicle in order to obtain the wheel speed difference.

11. The tire state determining apparatus according to claim 9, wherein the physical quantity relating to the tire radius is one of a radius ratio of a tire other than a reference tire to a radius of the reference tire and the tire radius obtained from the radius ratio, the physical quantity relating to the road surface friction coefficient is one of a reciprocal of a road surface friction coefficient gradient with respect to a slip rate and the road surface friction coefficient gradient obtained from the reciprocal, and the physical quantity relating to the spring constant is one of a reciprocal of the spring constant of a combination spring standardized by dividing the spring constant of the combination spring by a vehicle body weight and the spring constant of the combination spring obtained from the reciprocal of the spring constant.

12. The tire state determining apparatus according to claim 9, wherein
    the estimating portion estimates two physical quantities from among the tire radius, the road surface friction coefficient, and the spring constant of the combination spring which combines spring elements; and
    the determining portion makes at least one determination from among a tire type determination based on the estimated road surface friction coefficient gradient and spring constant of the combination spring, a tire air pressure determination based on the estimated tire radius and spring constant of the combination spring, and a tire wear state determination based on the estimated tire radius and road surface friction coefficient gradient.

13. The tire state determining apparatus according to claim 9, wherein:
    the determining portion determines the tire type based on the road surface friction coefficient gradient when the slip rate is near zero.

14. The tire state determining apparatus according to claim 9, wherein:
    the determining portion calculates one of radius ratios $k_{rn}$ and $k_{rm}$ of a plurality of tires other than the reference tire, to a radius $R_0$ of the reference tire, and the tire radii;
    calculates one of reciprocals $1/\beta_n$ and $1/\beta_m$ of the road surface friction coefficient gradients with respect to slip rates of the plurality of tires, and the road surface friction coefficient gradients and
    calculates one of reciprocals $1/k_{stn}$ and $1/k_{stm}$ of the spring constants of combination springs standardized by dividing the spring constants of the combination springs of the plurality of tires by a vehicle body weight, and the spring constants of the combination springs, based on an expression $$R_0(k_m\omega_n - k_{rm}\omega_m) = \left(\frac{k_{fn}v_a}{k_{\omega n}\beta_n} - \frac{k_{fm}v_a}{k_{\omega n}\beta_m}\right)g_v + \left(\frac{k_{fn}}{k_{stn}} - \frac{k_{fm}}{k_{stm}}\right)d_v$$

where ωn and ωm represent angular velocities of the plurality of wheels; $v_a$ represents an average wheel speed of the four wheels; $g_v$ represents a ratio of the vehicle body acceleration rate to a gravitational force acceleration rate; and $d_v$ represents a derivative of the vehicle body acceleration rate that has been standardized by a gravitational acceleration rate.

15. The tire state determining apparatus according to claim 9, further comprising:
a notifying apparatus that notifies an occupant of at least one of the tire type, the value of the tire air pressure, and the tire wear state.

16. The tire state determining apparatus according to claim 8, wherein the physical quantity relating to the tire radius of each wheel is estimated using the known value of the distribution ratio of the braking force and driving force to each wheel and the known distribution ratio of the load on each wheel, based on the wheel speed difference between any two wheels and the acceleration and deceleration rate of the vehicle, during acceleration and deceleration of the vehicle, of an ideal vehicle model that takes into consideration a difference in the tire radius of the vehicle.

17. The tire state determining apparatus according to claim 16, further comprising:
a first detector that detects the acceleration and deceleration rate of the vehicle, and
a second detector that detects a wheel speed of the vehicle in order to obtain the wheel speed difference.

18. The tire state determining apparatus according to claim 16, wherein the physical quantity relating to the tire radius is one of a radius ratio of a tire other than a reference tire to a radius of the reference tire and the tire radius obtained from the radius ratio, the physical quantity relating to the road surface friction coefficient is one of a reciprocal of a road surface friction coefficient gradient with respect to a slip rate and the road surface friction coefficient gradient obtained from the reciprocal, and the physical quantity relating to the spring constant is one of a reciprocal of the spring constant of a combination spring standardized by dividing the spring constant of the combination spring by a vehicle body weight and the spring constant of the combination spring obtained from the reciprocal of the spring constant.

19. The tire state determining apparatus according to claim 16, wherein:
the estimating portion estimates two physical quantities from among the tire radius, the road surface friction coefficient, and the spring constant of the combination spring which combines spring elements; and
the determining portion makes at least one determination from among a tire type determination based on the estimated road surface friction coefficient gradient and spring constant of the combination spring, a tire air pressure determination based on the estimated tire radius and spring constant of the combination spring, and a tire wear state determination based on the estimated tire radius and road surface friction coefficient gradient.

20. The tire state determining apparatus according to claim 16, wherein:
the determining portion determines the tire type based on the road surface friction coefficient gradient when the slip rate is near zero.

21. The tire state determining apparatus according to claim 16, wherein:
the estimating portion calculates one of radius ratios $k_{rn}$ and $k_{rm}$ of a plurality of tires other than the reference tire, to a radius $R_0$ of the reference tire, and the tire radii;
calculates one of reciprocals $1/\beta_n$ and $1/\beta_m$ of the road surface friction coefficient gradients with respect to slip rates of the plurality of tires, and the road surface friction coefficient gradients; and
calculates one of reciprocals $1/k_{stn}$ and $1/k_{stm}$ of the spring constants of combination springs standardized by dividing the spring constants of the combination springs of the plurality of tires by a vehicle body weight, and the spring constants of the combination springs, based on an expression $$R_0(k_m\omega_n - k_{rm}\omega_m) = \left(\frac{k_{fn}v_a}{k_{\omega n}\beta_n} - \frac{k_{fm}v_a}{k_{\omega n}\beta_m}\right)g_v + \left(\frac{k_{fn}}{k_{stn}} - \frac{k_{fm}}{k_{stm}}\right)d_v$$

where, ωn and ωm represent angular velocities of the plurality of wheels; $v_a$ represents an average wheel speed of the four wheels; $g_v$ represents a ratio of the vehicle body acceleration rate to a gravitational force acceleration rate; and $d_v$ represents a derivative of the vehicle body acceleration rate that has been standardized by the gravitational acceleration rate.

22. The tire state determining apparatus according to claim 16, further comprising:
a notifying apparatus that notifies an occupant of at least one of the tire type, the value of the tire air pressure, and the tire wear state.

23. A physical quantity estimating method, comprising the step of:
estimating at least one of a physical quantity relating to a tire radius of each wheel, a physical quantity relating to a road surface friction coefficient, and a physical quantity relating to a spring constant of a combination spring which combines spring elements, using a known value of a distribution ratio of a braking force and a driving force to each wheel and a known distribution ratio of a load on each wheel, based on a wheel speed difference between any two wheels and the acceleration and deceleration rate of a vehicle during acceleration and deceleration of the vehicle.

24. The physical quantity estimating method according to claim 23, wherein the physical quantity relating to the spring constant of the combination spring which combines spring elements of each wheel is estimated using the known value of the distribution ratio of the braking force and driving force to each wheel and the known distribution ratio of the load on each wheel, based on the wheel speed difference between any two wheels and the acceleration and deceleration rate of the vehicle, during acceleration and deceleration of the vehicle, of an ideal vehicle model that takes into consideration a tire torsional spring element and a suspension longitudinal spring element of the vehicle.

25. The physical quantity estimating method according to claim 24, wherein the physical quantity relating to the tire radius is one of a radius ratio of a tire other than a reference tire to a radius of the reference tire and the tire radius obtained from the radius ratio, the physical quantity relating to the road surface friction coefficient is one of a reciprocal of a road surface friction coefficient gradient with respect to a slip rate and the road surface friction coefficient gradient obtained from the reciprocal, and the physical quantity relating to the spring constant is one of a reciprocal of the spring constant of a combination spring standardized by dividing the spring constant of the combination spring by a vehicle body weight and the spring constant of the combination spring obtained from the reciprocal of the spring constant.

26. The physical quantity estimating method according to claim 23, wherein the physical quantity relating the tire radius of each wheel is estimated using the known value of the distribution ratio of the braking force and driving force to each wheel, and the known distribution ratio of the load on each wheel, based on a wheel speed difference between any two wheels and the acceleration and deceleration rate of the vehicle, during acceleration and deceleration of the vehicle, of an ideal vehicle model that takes into consideration a difference in the tire radius of the vehicle.

27. The physical quantity estimating method according to claim 26, wherein the physical quantity relating to the tire radius is one of a radius ratio of a tire other than a reference tire to a radius of the reference tire and the tire radius obtained from the radius ratio, the physical quantity relating to the road surface friction coefficient is one of a reciprocal of a road surface friction coefficient gradient with respect to a slip rate and the road surface friction coefficient gradient obtained from the reciprocal, and the physical quantity relating to the spring constant is one of a reciprocal of the spring constant of a combination spring standardized by dividing the spring constant of the combination spring by a vehicle body weight and the spring constant of the combination spring obtained from the reciprocal of the spring constant.

28. A tire state determination method, comprising the steps of:
   estimating at least one of a physical quantity relating to a tire radius of each wheel, a physical quantity relating to a road surface friction coefficient, and a physical quantity relating to a spring constant of a combination spring which combines spring elements, using a known value of a distribution ratio of a braking force and a driving force to each wheel and a known distribution ratio of a load on each wheel, based on a wheel speed difference between any two wheels and the acceleration and deceleration rate of a vehicle during acceleration and deceleration of the vehicle; and
   determining at least one of a tire type, a tire air pressure, and a tire wear state, based on at least one of the physical quantities estimated by the estimating portion.

29. The tire state determination method according to claim 28, wherein the physical quantity relating to the spring constant of the combination spring which combines spring elements of each wheel is estimated using the known value of the distribution ratio of the braking force and driving force to each wheel and the known distribution ratio of the load on each wheel, based on the wheel speed difference between any two wheels and the acceleration and deceleration rate of the vehicle, during acceleration and deceleration of the vehicle, of an ideal vehicle model that takes into consideration a tire torsional spring element and a suspension longitudinal spring element of the vehicle.

30. The tire state determination method according to claim 29, wherein the physical quantity relating to the tire radius is one of a radius ratio of a tire other than a reference tire to a radius of the reference tire and the tire radius obtained from the radius ratio, the physical quantity relating to the road surface friction coefficient is one of a reciprocal of a road surface friction coefficient gradient with respect to a slip rate and the road surface friction coefficient gradient obtained from the reciprocal, and the physical quantity relating to the spring constant is one of a reciprocal of the spring constant of a combination spring standardized by dividing the spring constant of the combination spring by a vehicle body weight and the spring constant of the combination spring obtained from the reciprocal of the spring constant.

31. The tire state determination method according to claim 29, wherein the estimating process estimates two physical quantities from among the tire radius, the road surface friction coefficient, and the spring constant of the combination spring which combines the spring elements and the determining process makes at least one determination from among a tire type determination based on the estimated road surface friction coefficient gradient and spring constant of the combination spring, a tire air pressure determination based on the estimated tire radius and spring constant of the combination spring, and a tire wear state determination based on the estimated tire radius and road surface friction coefficient gradient.

32. The tire state determination method according to claim 29, wherein the tire type is determined based on the road surface friction coefficient gradient when the slip rate is near zero.

33. The tire state determination method according to claim 29, wherein the estimating process calculates one of radius ratios $k_{rn}$ and $k_{rm}$ of a plurality of tires other than the reference tire, to a radius $R_0$ of the reference tire, and the tire radii, calculates one of reciprocals $1/\beta_n$ and $1/\beta_m$ of the road surface friction coefficient gradients with respect to slip rates of the plurality of tires, and the road surface friction coefficient gradients and calculates one of reciprocals $1/k_{stn}$ and $1/k_{stm}$ of the spring constants of combination springs standardized by dividing the spring constants of the combination springs of the plurality of tires by a vehicle body weight, and the spring constants of the combination springs, based on an expression $$R_0(k_m\omega_n - k_{rn}\omega_m) = \left(\frac{k_{fn}v_a}{k_{\omega n}\beta_n} - \frac{k_{fm}v_a}{k_{\omega n}\beta_m}\right)g_v + \left(\frac{k_{fn}}{k_{stn}} - \frac{k_{fm}}{k_{stm}}\right)d_v$$

where, ωn and ωm represent angular velocities of the plurality of wheels; $v_a$ represents an average wheel speed of the four wheels; $g_v$ represents a ratio of the vehicle body acceleration rate to a gravitational force acceleration rate; and $d_v$ represents a derivative of the vehicle body acceleration rate that has been standardized by the gravitational acceleration rate.

34. The tire state determination method according to claim 28, wherein the physical quantity relating to the tire radius of each wheel is estimated using the known value of the distribution ratio of the braking force and driving force to each wheel and the known distribution ratio of the load on each wheel, based on the wheel speed difference between any two wheels and the acceleration and deceleration rate of the vehicle, during acceleration and deceleration of the vehicle, of an ideal vehicle model that takes into consideration a difference in the tire radius of the vehicle.

35. The tire state determination method according to claim 34, wherein the physical quantity relating to the tire radius is one of a radius ratio of a tire other than a reference tire to a radius of the reference tire and the tire radius obtained from the radius ratio, the physical quantity relating to the road surface friction coefficient is one of a reciprocal of a road surface friction coefficient gradient with respect to a slip rate and the road surface friction coefficient gradient obtained from the reciprocal, and the physical quantity relating to the spring constant is one of a reciprocal of the spring constant of a combination spring standardized by dividing the spring constant of the combination spring by a vehicle body weight and the spring constant of the combination spring obtained from the reciprocal of the spring constant.

36. The tire state determination method according to claim 34, wherein the estimating process estimates two physical quantity from among the tire radius, the road surface friction coefficient, and the spring constant of the combination spring which combines spring elements and the determining process makes at least one determination from among a tire type determination based on the estimated road surface friction coefficient gradient and spring constant of the combination spring, a tire air pressure determination based on the estimated tire radius and spring constant of the combination spring, and a tire wear state determination based on the estimated tire radius and road surface friction coefficient gradient.

37. The tire state determination method according to claim 34, wherein the tire type is determined based on the road surface friction coefficient gradient when the slip rate is near zero.

38. The tire state determination method according to claim 34, wherein the estimating process calculates one of radius ratios $k_{rn}$ and $k_{rm}$ of a plurality of tires other than the reference tire, to a radius $R_0$ of the reference tire, and the tire radii, calculates one of reciprocals $1/\beta_n$ and $1/\beta_m$ of the road surface friction coefficient gradients with respect to slip rates of the plurality of tires, and the road surface friction coefficient gradients and calculates one of reciprocals $1/k_{stn}$ and $1/k_{stm}$ of the spring constants of combination springs standardized by dividing the spring constants of the combination springs of the plurality of tires by a vehicle body weight, and the spring constants of the combination springs, based on an expression $$R_0(k_m\omega_n - k_{rm}\omega_m) = \left(\frac{k_{fn}v_a}{k_{\omega n}\beta_n} - \frac{k_{fm}v_a}{k_{\omega n}\beta_m}\right)g_v + \left(\frac{k_{fn}}{k_{stn}} - \frac{k_{fm}}{k_{stm}}\right)d_v$$

wherein, ωn and ωm represent angular velocities of the plurality of wheels; $v_a$ represents an average wheel speed of the four wheels; $g_v$ represents a ratio of the vehicle body acceleration rate to a gravitational force acceleration rate; and $d_v$ represents a derivative of the vehicle body acceleration rate that has been standardized by the gravitational acceleration rate.

* * * * *